US011916582B2

(12) United States Patent
Heim

(10) Patent No.: US 11,916,582 B2
(45) Date of Patent: Feb. 27, 2024

(54) METHODS AND SYSTEMS FOR DETERMINING A NOISE-ROBUST ACQUISITION CONFIGURATION FOR OPERATING A SENSOR SYSTEM

(71) Applicant: Microchip Technology Incorporated, Chandler, AZ (US)

(72) Inventor: Axel Heim, Munich (DE)

(73) Assignee: Microchip Technology Incorporated, Chandler, AZ (US)

( * ) Notice: Subject to any disclaimer, the term of this patent is extended or adjusted under 35 U.S.C. 154(b) by 102 days.

(21) Appl. No.: 17/198,860

(22) Filed: Mar. 11, 2021

(65) Prior Publication Data

US 2022/0190857 A1 Jun. 16, 2022

Related U.S. Application Data

(60) Provisional application No. 63/126,137, filed on Dec. 16, 2020.

(51) Int. Cl.
*H04B 1/10* (2006.01)
*G06F 3/041* (2006.01)

(52) U.S. Cl.
CPC ....... *H04B 1/1027* (2013.01); *G06F 3/04162* (2019.05); *G06F 3/04182* (2019.05)

(58) Field of Classification Search
CPC ............... H04B 1/1027; G06F 3/04162; G06F 3/04182
See application file for complete search history.

(56) References Cited

U.S. PATENT DOCUMENTS 9,569,032 B2 * 2/2017 Westhues ............ G06F 3/04166
10,151,608 B2 * 12/2018 Fontes .................. G06F 3/0446
(Continued)

FOREIGN PATENT DOCUMENTS

EP         3229030 A1   10/2017  ............. G01R 13/00
WO   2018/015412 A1    1/2018  ............. H03H 17/06

OTHER PUBLICATIONS

English Translation of CN 108152767 (Year: 2018).*
(Continued)

*Primary Examiner* — Patrick N Edouard
*Assistant Examiner* — Eboni N Giles
(74) *Attorney, Agent, or Firm* — SLAYDEN GRUBERT BEARD PLLC

(57) ABSTRACT

Systems and methods of determining a noise-robust acquisition configuration for a sensor or communication system are disclosed. An exemplary method comprises a noise scan with: obtaining a sensor receive signal from the sensor system; determining a digital receive signal from the sensor receive signal by A/D conversion of the sensor receive signal at a predefined noise scan frequency; determining a plurality of decimated digital receive signals by integer decimation of the digital receive signal using two or more decimation rates that differ from each other, wherein each of the two or more decimation rates is associated with a respective candidate acquisition configuration; determining one or more noise measures for multiple of the candidate acquisition configurations using one or more of the plurality of decimated digital receive signals; and using the one or more noise measures, determining the acquisition configuration for operation of the sensor system from the candidate acquisition configurations.

25 Claims, 16 Drawing Sheets

(56) References Cited

U.S. PATENT DOCUMENTS

| | | | |
|---|---|---|---|
| 2005/0097154 A1 | 5/2005 | Tsecouras | 708/300 |
| 2006/0010185 A1 | 1/2006 | He | 708/290 |
| 2013/0106779 A1* | 5/2013 | Company Bosch | G06F 3/04182 345/174 |
| 2014/0049266 A1 | 2/2014 | Heim et al. | 324/603 |
| 2015/0212623 A1* | 7/2015 | Hatano | G06F 3/04186 345/174 |
| 2015/0297193 A1 | 10/2015 | Rothberg et al. | 600/459 |
| 2018/0278290 A1 | 9/2018 | Moorti et al. | |
| 2021/0194497 A1* | 6/2021 | Lamb | H03H 17/0628 |

OTHER PUBLICATIONS

Partial International Search Report and Invitation to Pay Additional Fees, Application No. PCT/US2021/022950, 17 pages, dated Aug. 25, 2021.
International Search Report and Written Opinion, Application No. PCT/US2021/022950, 20 pages, dated Oct. 19, 2021.

* cited by examiner

METHODS AND SYSTEMS FOR DETERMINING A NOISE-ROBUST ACQUISITION CONFIGURATION FOR OPERATING A SENSOR SYSTEM

CROSS REFERENCE TO RELATED APPLICATION

This application claims priority to U.S. Provisional Patent Application 63/126,137, filed on Dec. 16, 2020 with the United States Patent and Trademark Office. The contents of the aforesaid patent application are incorporated herein for all purposes.

FIELD

The present disclosure relates to methods and systems for determining a noise-robust acquisition configuration, in particular for a sensor system.

BACKGROUND

This background section is provided for the purpose of generally describing the context of the disclosure. Work of the presently named inventor(s) as well as aspects of the description that may not otherwise qualify as prior art at the time of filing, are neither expressly nor impliedly admitted as prior art against the present disclosure.

Sensor systems, sometimes also referred as 'sensing systems' are known for various applications. For example, capacitive touch sensor systems are being used for user interfaces of electronic devices, such as computers, tablets, smart phones, and other electronic devices.

Capacitive touch sensor systems can be realized, for example, by generating an alternating electrical field and measuring the potential difference (i.e., the voltage) obtained in one cycle at a sensor electrode within this field. A single electrode or a combination of a transmitting and one or more receiving electrodes may be used. This voltage is a measure for the capacitance between the sensor electrode and its electrical environment, i.e., it is influenced by objects like a human finger or a hand. Alternatively, an electric current flowing between an electrode and the sensor circuit (i.e., motion of electrical charges), can be used to determine the capacitance between the sensor electrode and its electrical environment.

A problem with conventional systems operating according to the above-mentioned principle is that electrical noise sources, such as switched-mode power supplies, fluorescent lamps, or radio communication in the vicinity of the sensor can affect the electrical field. Thus, accurately and reliably estimating this voltage in a noisy environment is problematic.

As the instant inventor has determined, robustness to noise is a challenge for any sensor system, including capacitive touch sensing systems, and also for communication systems. Particularly, the passing of standard International Electrotechnical Commission (IEC) conducted noise tests, e.g. with amplitude modulated noise as in IEC 61000-4-6, bulk current injection (BCI) tests, e.g. according to the ISO 11452-4 automotive standard, or robustness to square noise have been problematic in the past.

SUMMARY

Based on the preceding, a need exists to allow a noise-robust operation of a sensor system, such as for example a capacitive touch sensor system. The object is solved by the subject matter of the independent claims. The dependent claims and the following description comprise various embodiments of the invention.

In general and in one exemplary aspect, a method of determining a noise-robust acquisition configuration for operation of a sensor system is provided. The method comprises the following steps in a noise scan:

obtaining a sensor receive signal from the sensor system;

determining a digital receive signal from the sensor receive signal by A/D conversion of the sensor receive signal at a predefined noise scan frequency;

determining a plurality of decimated digital receive signals by integer decimation of the digital receive signal using two or more decimation rates that differ from each other, wherein each of the two or more decimation rates is associated with a respective candidate acquisition configuration;

determining one or more noise measures for multiple of the candidate acquisition configurations using one or more of the plurality of decimated digital receive signals; and using the one or more noise measures, determining the acquisition configuration for operation of the sensor system from the candidate acquisition configurations.

In general and in another exemplary aspect, a sensor circuit is provided to determine an acquisition configuration for operation of a sensor system, comprising:

a sensor interface for obtaining a sensor receive signal from the sensor system;

an A/D converter to determine digital receive signal from the sensor receive signal by A/D conversion of the sensor receive signal at a predefined noise scan frequency;

a decimation circuit, configured to determine a plurality of decimated digital receive signals by integer decimation of the digital receive signal using two or more decimation rates that differ from each other, wherein each of the two or more decimation rates is associated with a respective candidate acquisition configuration;

a noise evaluation circuit, configured to determine one or more noise measures for multiple of the acquisition configurations using one or more of the plurality of decimated digital receive signals; and a configuration circuit, configured to determine the acquisition configuration for operation of the sensor system from the candidate acquisition configurations using the one or more noise measures.

In general and in another exemplary aspect, a capacitive touch sensing system is provided, comprising:

one or more electrodes, configured for capacitive sensing; and the sensor circuit of the preceding aspect, wherein the sensor circuit is connected to at least one of the one or more electrodes.

In general and in another exemplary aspect, a method of determining a noise-robust acquisition configuration for operation of a communication system is provided. The method comprises the following steps in a noise scan:

obtaining a receive signal from the communication system;

determining a digital receive signal from the receive signal by A/D conversion of the receive signal at a predefined noise scan frequency;

determining a plurality of decimated digital receive signals by integer decimation of the digital receive signal using two or more decimation rates that differ from each other, wherein each of the two or more decimation rates is associated with a respective candidate acquisition configuration;

determining one or more noise measures for multiple of the acquisition configurations using one or more of the plurality of decimated digital receive signals; and using the one or more noise measures, determining the acquisition configuration for operation of the communication system from the candidate acquisition configurations.

In general and in another exemplary aspect, a communication circuit to determine an acquisition configuration for operation of a communication system is provided. The communication circuit comprises:

a communication system interface for obtaining a receive signal from the communication system;

an A/D converter to determine digital receive signal from the receive signal by A/D conversion of the receive signal at a predefined noise scan frequency;

a decimation circuit, configured to determine a plurality of decimated digital receive signals by integer decimation of the digital receive signal using two or more decimation rates that differ from each other, wherein each of the two or more decimation rates is associated with a respective acquisition configuration;

a noise evaluation circuit, configured to determine one or more noise measures for multiple of the acquisition configurations using one or more of the plurality of decimated digital receive signals; and a configuration circuit, configured to determine the acquisition configuration for operation of the communication system from the candidate acquisition configurations using the one or more noise measures.

The details of one or more embodiments are set forth in the accompanying drawings and the description below. Other features will be apparent from the description, drawings, and from the claims.

DETAILED DESCRIPTION

Figure 1:
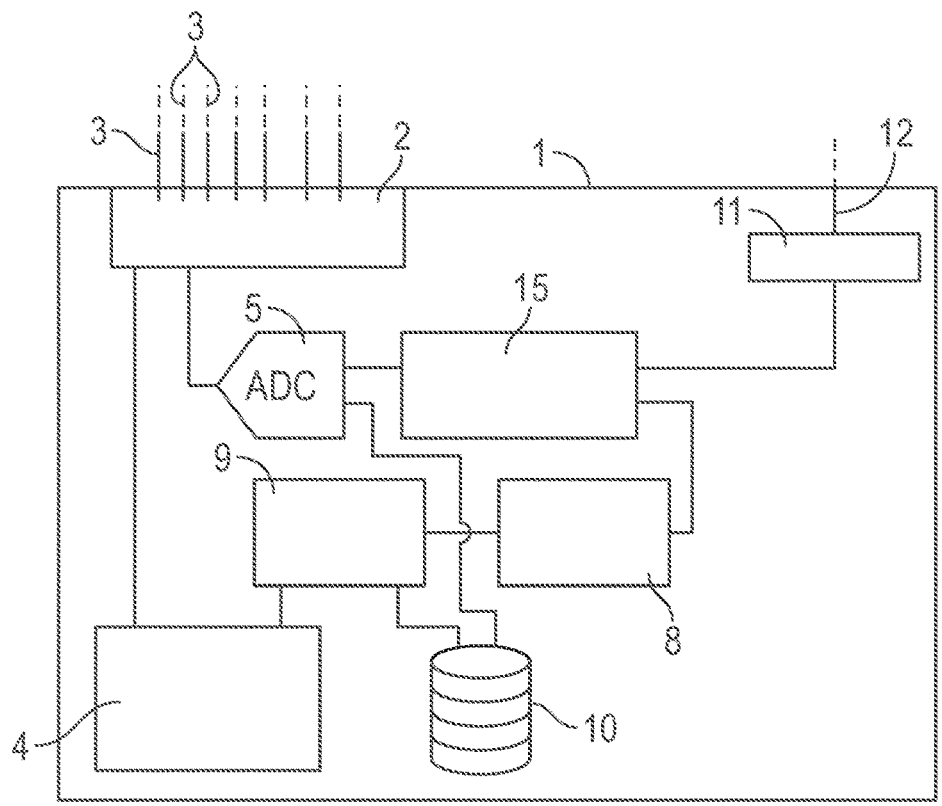
FIG. 1 shows a first exemplary embodiment of a sensor circuit in a schematic block diagram.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data or signal connection between at least two components, devices, units, processors, circuits, or modules. Such a connection may be direct between the respective components, devices, units, processors, circuits, or modules; or indirect, i.e., over intermediate components, devices, units, processors, circuits, or modules. The connection may be permanent or temporary; wireless or conductor based; digital or analog.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In many applications, sensor systems are used. For example, today's electronic devices, such as smart phones, laptops, tablets, wearables, would be unthinkable without touchscreens, which generally use capacitive or resistive touch sensor systems. Current developments increase the use of touchscreens in more complex systems, such as cars, airplanes, or industrial equipment.

Robustness to noise is, as mentioned in the preceding, a key challenge for any such sensor system. A particular issue with capacitive touchscreens is that these, by design, face the user and need to be configured so that the used electric field can be influenced, e.g., when the user's hand or finger is in proximity. This makes these types of touchscreens particularly vulnerable to noise from surrounding fields.

Furthermore, and as the inventor has recognized, there are no reliable means for determining the expected signal-to-noise ratio (in the following also referred to as 'SNR') for a given sensor and configuration, which either leads to insufficient output SNR or a waste of resources, e.g. acquisition time. For a customer of a touch sensing system (e.g., a smart phone manufacturer), it is important to yield a high touch report rate with reliable and accurate output estimates. Touch report rate hereby refers to the rate at which a touch controller forwards, for example, (x,y) position estimates to a host controller.

There are several impact factors affecting noise robustness of a sensor system, for example one or more of the operating frequency (in case of a capacitive sensor system the operating frequency of a so-called 'stimulus signal') with its associated sampling frequency for A/D conversion, the scan duration, and the choice of low-pass filter coefficients. In the context of the present discussion, the set of configurable parameters of the sensor system that influence these impact factors is understood as the 'acquisition configuration' or 'data acquisition configuration' of the sensor system (in the following also referred to as 'AC' for simplicity). In some embodiments, the acquisition configuration comprises at least one or more of the following parameters: a sampling frequency for A/D conversion, an operating frequency (carrier frequency) of a stimulus signal for (acquisition) operation of the sensor system, scan duration, a number of samples to be acquired, 'packet length', and low-pass filter coefficients. Different ACs differ in one or more of these parameters. The parameters may be used to configure the 'analog front-end' as well as the digital processing of the sensor control circuit.

The receive signal of a communication or sensing system typically is a mixture of the actual information that needs to be received and evaluated, as well as noise. This information can, for example, be a measure for the capacitance or distance between a sensor electrode and a user's finger. In the case of additive noise, the receive signal simply is the sum of information and noise. Because typically both the information part and the noise part are unknown, the information part cannot be easily extracted from the receive signal—comparable to one equation with two unknowns which cannot be solved uniquely. What is possible however is estimating the information part given the noisy receive signal while making assumptions about properties of information, noise or both, e.g., 'the information is varying slowly over time'. The less noise there is, the more accurate the resulting estimate, i.e., the smaller the estimate uncertainty. Therefore, one would like to employ an acquisition configuration for which there is only little noise, e.g., an acquisition configuration which exhibits less noise in the resulting estimate as compared to another acquisition configuration.

It is possible to conduct a test measurement with the sensor system and to compute a noise measure from this measurement data, which is representative for the amount of noise. Such test measurements are in the present context referred to as 'noise scans'.

Noise scans may be conducted for different candidate ACs, and given the respective noise determined, the AC for which the lowest amount of noise was yielded can be selected. Measurements where the receive signal contains both the desired information and noise will be referred to as signal-and-noise scan, or 'SN-scan'. During an SN-scan, the sensor or communication system may need to create and emit a stimulus signal to excite an alternating electric field and to yield the information part at the receive side. From data acquired during a noise scan, estimates of the amount of noise to be expected during an SN-scan for pre-defined candidate ACs can be computed. Herein, such an estimate is referred to as 'noise estimate'. The ACs for which noise estimates are computed from noise scan data acquired during a single noise scan may differ at least in their operating frequency and sampling frequency, which are considered parameters of the analog front-end of the sensor system.

In the present context, a 'stimulus signal', or simply 'stimulus', is understood as an actively controlled movement of electrical charges between a sensor circuit, e.g., a chip, and an electrode, for example to drive the electrode's electrical potential to a given target value or target signal. In some embodiments, this target value or target signal is specified before the stimulus is initiated; for example, when the target signal is a rectangular pulse train with a given pulse frequency, this pulse frequency is selected before driving the electrode's electrical potential to this target signal.

In some embodiments, the stimulus may be a periodic signal, e.g., a rectangular pulse train. The frequency of this periodic signal, e.g. the pulse frequency, is the operating frequency discussed in the preceding, also referred to as 'carrier frequency'. In some embodiments, the stimulus signal settles alternately to a higher signal level and a lower signal level each once during a carrier signal period. On the receive side, the receive(d) signal may be demodulated and low-pass filtered—both of which may be performed in the digital domain after analog-to-digital (A/D) conversion. When the stimulus is a rectangular pulse train, sampling may be conducted at twice the carrier frequency in some embodiments. Demodulation may be conducted by alternatingly multiplying the A/D converted samples with plus one and minus one in some embodiments.

Based on the preceding, a need addressed by embodiments of the invention is to select a suitable AC from a set of candidate ACs in order to achieve, e.g., a high touch report rate with reliable and accurate output estimates.

Basic exemplary ideas of the invention comprise a) the idea of base- and sub-frequencies, allowing to process the same sequence of noise scan measurement data in different ways, more precisely with different parameters, in order to yield reliable noise (power) estimates for multiple ACs (for example with respect to carrier frequencies and scan times), and b) a robust noise measure providing an accurate estimate for the true noise power of SN-scan measurement data after demodulation and low-pass filtering.

According to a first exemplary aspect, a method of determining a noise-robust acquisition configuration for operation of a sensor system comprises the following steps in a noise scan:

obtaining a sensor receive signal from the sensor system;

determining a digital receive signal from the sensor receive signal by A/D conversion of the sensor receive signal at a predefined noise scan frequency;

determining a plurality of decimated digital receive signals by integer decimation of the digital receive signal using two or more decimation rates that differ from each other, wherein the two or more decimation rates are associated with a respective candidate acquisition configuration;

determining one or more noise measures for multiple of the candidate acquisition configurations using one or more of the plurality of decimated digital receive signals; and using the one or more noise measures, determining the acquisition configuration for operation of the sensor system from the candidate acquisition configurations.

The sensor system of the present aspect may be of any suitable type, including, without limitation, sensor systems to detect and measure proximity, pressure, position, displacement, force, humidity, fluid level, and acceleration. For example, the sensor system may be an infrared sensor system or an ultrasound sensor system. For example, the sensor system may be a capacitive or resistive touch sensor system, such as for a touchscreen display. For example, the sensor system may be a touch-less sensor system.

In some embodiments, the method of the present aspect is conducted using a sensor circuit, for example a sensor circuit comprising a control unit, such as a microcontroller and/or microprocessor with suitable programming. Alternatively or additionally, the sensor circuit may comprise dedicated circuitry that provides at least a part of the functionality of the method of this exemplary aspect.

As discussed in the preceding, the noise scan of the present aspect may be considered a test measurement to determine, e.g., the effects of noise on the respective sensor system. In some embodiments, the measurement data obtained during the noise scan does not contain any information but only noise, i.e., the sensor receive signal during the noise scan is acquired without a stimulus signal being applied to the sensor system.

The (sensor) receive signal (i.e., a received, measured or acquired signal during a noise scan or SN-scan) may be, for example, an electric current flowing between an electrode and the sensor circuit, i.e., motion of electrical charges, an electric current integrated over a certain time interval, or an electric potential or voltage of the electrode relative to a reference potential. The sensor receive signal may be obtained from the sensor system by any suitable means, for example a corresponding conductive connection.

This receive signal may be affected by the stimulus when used, possibly modified by environmental factors like a human finger, and is in most circumstances affected by environmental noise sources. In addition to these environmental, or external, impact factors, there can be analog pre-processing within the sensor circuitry which can add further internal noise to the receive signal, for example 1/f noise or quantization noise of an A/D converter. While robustness to noise from internal sources typically can be addressed during system design, environmental noise sources are at least to some extent unknown at design time. The methods and systems discussed herein address robustness to external noise. Disregarding internal noise, any change in the receive signal, i.e., any electric current or change in above electric potential, is caused by this external noise of interest.

According to the first exemplary aspect, the method comprises determining a digital receive signal from the sensor receive signal by A/D conversion of the sensor receive signal at a predefined noise scan frequency. A/D conversion may be conducted using any suitable method, for example using a flash A/D converter, an integrating A/D converter, a successive approximation A/D converter, a sigma-delta A/D converter, a direct-conversion A/D converter, a ramp-compare A/D converter, a Wilkinson A/D converter, a charge balancing A/D converter, a dual-slope A/D converter, a delta-encoded A/D converter, a pipelined A/D converter, a time-interleaved A/D converter, an intermediate FM stage A/D converter, a TS-ADC, or any equivalent, without limitation. The term "A/D converter" herein includes setups of an analog front-end with a suitable A/D converter. A/D conversion is conducted at the predefined noise scan frequency that may be set depending on the application. In some embodiments, the noise scan frequency is significantly higher than an operating frequency of a stimulus signal during operation of the sensor system. In some embodiments, the noise scan frequency may be set to at least three times the operating frequency, such as between 3×-40× of the operating frequency. In some embodiments, the noise scan frequency is set between 3×-4× of the operating frequency.

In some embodiments, the noise scan frequency, i.e., the sampling rate of the A/D converter during a noise scan, may be significantly higher than the sampling rate of the A/D converter during an SN-scan. Inversely, the sampling interval of the A/D converter may be significantly shorter for a noise scan as compared with an SN-scan, and so is the time available for the analog processing of the received input signal for an analog-to-digital (A/D) converted sample. Consequently, the timing for analog processing desired for an SN-scan may not be applicable to a noise scan because there is less time between A/D conversions. Embodiments are discussed in the following using a specific ratio of an aperture time for a noise scan to an aperture time for an SN-scan.

According to the first exemplary aspect, the method comprises determining a plurality of decimated digital receive signals by integer decimation of the digital receive signal using two or more decimation rates that differ from each other.

In other words, after the conducted A/D conversion, i.e., in the digital domain, the then digital receive signal is decimated by integer decimation to obtain the plurality of decimated digital receive signals. At least two different decimation rates are used, each of which is associated with a respective candidate acquisition configuration. In some embodiments, the two or more decimation rates are multiples of 2, such as for example, 2 and 4. In some embodiments more than two decimation dates are used.

The two or more decimation rates are associated with respective candidate acquisition configurations, e.g., in light of the resulting differing sampling rates when applying the different decimation rates.

According to the present aspect, one or more noise measures for multiple of the candidate acquisition configurations are determined using one or more of the plurality of decimated digital receive signals. In turn and using the one or more noise measures, the acquisition configuration for operation of the sensor system is determined from the candidate acquisition configurations.

As will be apparent from the preceding, the method according to the first aspect allows the use of the same measurement data of the sensor receive signal to determine multiple decimated digital receive signals. Since two or more decimation rates are used, the plurality of decimated digital receive signals correspondingly have two or more different sampling frequencies. Since the sampling frequency and the related operating frequency may be part of the acquisition configuration to be tested, i.e., the 'candidate ACs', the discussed method thus allows, e.g., to use the same measurement data to test multiple different candidate ACs.

In some embodiments, oversampling is conducted during a noise scan. Then, to yield the same aliasing (of noise) as for an SN-scan, the decimation rate for decimating the noise scan signal may for example be chosen such that the decimated sampling rate equals the SN-scan sampling rate.

As opposed to other known approaches, the teachings herein, at least in some embodiments, not only provide a solution for identifying a relatively best carrier frequency, but a complete solution for noise robustness. Robustness to, e.g., AM noise and square noise is provided due to the determination of the one or more noise measures from the same measurement data but for different ACs. This method also is inherently quick and saves measurement time. In some embodiments, the method further allows finding a trade-off between touch report rate and output SNR.

As discussed in the preceding, the method of the first exemplary aspect comprises determining one or more noise measures for multiple of the (two or more) candidate acquisition configurations from one or more of the plurality of the decimated digital receive signals. The determination of the noise measures may, for example, be conducted in the digital domain. In some embodiments, one or more noise measures are determined for each of candidate acquisition configurations, which allows for comparison of different candidate ACs. In some embodiments, a noise measure is calculated for each decimation rate from at least one decimated digital receive signal that is associated with the respective decimation rate. In some embodiments, a noise measure is calculated for each decimation rate from multiple decimated digital receive signals. This method will be discussed in more detail in the following.

The noise measure may be of any suitable type to obtain a comparable measure of noise. For example, the noise measure may be a numerical value, typically quantifying a noise level present in at least one of the plurality of decimated digital receive signals.

The noise measure in some embodiments may be a power measure as, for example, obtained by effective noise power estimation (ENPE), but it may also be, for example, a square root of a power measure or another linear measure, i.e., a quantity computed from input data using linear functions only, without limitation. In some embodiments, the noise measure is a phase-instantaneous noise measure. There are also approaches where the noise measure is a scoring value where a higher score indicates a lower noise level for an SN-scan, as for example discussed in U.S. Ser. No. 10/151,608 B2, incorporated herein for all purposes.

In some embodiments, there is a stimulus present during a scan to acquire data for computing noise measures, i.e., during the noise scan. While measurement data acquired during a scan of this kind is more likely to be influenced by, for example, a human finger in the sensor's vicinity, it can still be used to yield a sufficiently good decision base for identifying a suitable AC. This in mind, the term 'power measure' may in some embodiments be used interchangeable with the term 'noise measure'.

Once the one or more noise measures are determined, according to the first exemplary aspect, the acquisition configuration for operation of the sensor system is determined from the given candidate acquisition configurations. The present determination is based on the one or more noise measures. As will be discussed in more detail in the following, and in some embodiments, the determination may be influenced by further considerations, such as for example a shortest scan time (also referred to as 'scan duration').

In some embodiments, the step of determining the acquisition configuration comprises selecting a preferred noise measure from the one or more noise measures, wherein the acquisition configuration is set to correspond to the candidate acquisition configuration associated with the preferred noise measure.

In some embodiments, the preferred noise measure is selected based on a predefined criterium, such as for example based on a predefined threshold of maximum noise.

In some embodiments, the preferred noise measure yields the lowest noise level of the one or more noise measures. In other words, in these embodiments, the preferred noise measure can also be referred to as a 'best' noise measure, wherein the best noise measure is understood as a noise measure whose quantity indicates the lowest noise level compared to all other noise measures in a given comparison set of noise measures. For example, when the noise measure is determined by ENPE, then the best noise measure would have the lowest value, and according to the disclosure of U.S. Ser. No. 10/151,608B2, it would have the highest value.

In some embodiments, for each of the two or more decimation rates, corresponding groups of decimated digital receive signals (i.e., groups of two or more decimated digital receive signals) are determined as a part of the determination of the plurality of decimated digital receive signals. Accordingly, and in view of the two or more decimation rates, at least two groups of decimated digital receive signals are provided according to the present embodiments, wherein the group 'members' of one group share the same decimation rate.

In some embodiments, each decimated digital receive signal of a given group differs from all other decimated digital receive signals of the given group. The group of decimated digital receive signals may differ from each other in any suitable way. The group of decimated digital receive signals may have the same or a different number of samples.

In some embodiments and in each group, the decimated digital receive signals may differ from each other at least, but without limitation, by having a different starting phase. The present embodiments allow a further improved determination of noise, as will be apparent from the following discussion. The term 'starting phase' with respect to digital signals is understood as the delay of a decimated signal's first sample relative to the digital receive signal's first sample, typically in the unit of samples at the receive signal's sampling rate. Accordingly, a different starting phase with respect to two signals refers to that the two signals have differing starting samples.

As will be easily apparent, not all possible starting phases need to be represented in a given group of decimated digital receive signals. For example, for each of the at least two decimation rates $R(0,j)$ the digital receive signal x may be decimated for a subset of starting phases $v=v0$, $v0+dv$, $v0+2dv$, . . . , $R(0,j)-1$, where $j=0, 1, \ldots$ is denoted the sub-frequency index. In other embodiments, a group of decimated digital receive signals represent all possible starting phases. For example, for each of the at least two decimation rates $R(0,j)$, the signal x may be decimated for all starting phases $v=0, 1, \ldots, R(0,j)-1$. Accordingly, in the exemplary case of a digital receive signal with 24 samples and a decimation rate of four (i.e., R=4), the group would comprise four corresponding decimated digital receive signals with six samples each, and each signal starting at a different starting phase of the total of four possible starting phases. While each of the decimated digital receive signals of the group only comprises every fourth sample, due to the phase shift of one sample, every sample is still represented in the group resulting in an improved noise measure.

In some embodiments, the one or more noise measures are determined by an effective noise power estimation (ENPE), which comprises a determination of a (e.g., normalized) sum of phase-instantaneous noise measures over each of the decimated digital receive signals of one of the groups of decimated digital receive signals. In some embodiments, the effective noise power estimation is conducted for all groups, i.e., for all decimation rates. The determination of the sum of phase-instantaneous noise measures can be conducted by any suitable method. In some embodiments, the phase-instantaneous noise measure is a sum of (all) samples of a decimated digital receive signal weighted with coefficients from a coefficient vector. For example, the coefficient vector may be a vector containing the coefficients of a low-pass filter. For example, the coefficients of a boxcar window (all ones) or a Hann (or hanning) window of desired length. Normalization of such a sum term can, for example, be done by dividing this sum term by the sum of all coefficients in the coefficient vector. This normalization does not need to be done directly on the weighted sum term, but can also be done at later processing stage, e.g. after summing of phase-instantaneous noise measures, which can reduce computational complexity.

For example, to compute the ENPE for a given decimation rate, for each decimated digital receive signal of a given group, the dot product with the assigned coefficient vector is computed. In some embodiments, these dot products are normalized by dividing by the sum of all coefficients. Then the average of the squared normalized dot products may be computed to yield the ENPE.

In some embodiments, the step of determining the acquisition configuration from the set of candidate acquisition configurations comprises selecting the candidate acquisition configuration that has the shortest scan time while the noise measure meets a (predefined) noise threshold. The present embodiments provide a particularly high touch report rate as the shortest possible scan time is employed.

It is noted that in the context of comparing noise measures with a noise threshold, it is understood that this also encompasses the alternative of comparing expected output signal-to-noise ratio (SNR) with a (predefined) SNR threshold. The SNR can be computed from an a priori determined signal power and the noise measure determination, discussed in the preceding.

In some embodiments, the step of determining the acquisition configuration from the set of candidate acquisition configurations further comprises comparing the one or more noise measures with a noise threshold and in case the noise threshold is not met by any of the one or more noise measures, increasing the scan time of at least one of the candidate acquisition configurations to obtain at least one updated candidate acquisition configuration, determining one or more updated noise measures for the at least one updated candidate acquisition configuration, and comparing the one or more updated noise measures with the noise threshold.

The present embodiments allow to gradually evaluate candidate acquisition configurations with increased scan time in case none of the original candidate acquisition configurations meets the desired noise threshold, which may, e.g., be set in accordance with the respective application. Correspondingly and in some embodiments, the discussed steps may be repeated until an acquisition configuration is found that meets the noise threshold. In case that, in a given iteration, multiple candidate acquisition configurations are found that meet the threshold, in some embodiments the candidate acquisition configuration is selected as acquisition configuration for system operation that has the lowest noise level for the scan time of the given iteration. In some embodiments, the scan time of multiple or all candidate acquisition configurations is increased in a given iteration of the preceding steps. This provides multiple updated candidate acquisition configurations that may have the same operating and sampling frequency, but different coefficient vectors.

In some embodiments, the scan time is increased by a substantially integer multiple of a scan time of the original/preceding candidate acquisition configuration. These embodiments are particularly beneficial for reducing noise.

In some embodiments, a 'substantially integer multiple' comprises percentage deviations from the integer multiple of approx.

$$\pm \frac{100}{T}\%,$$

where T is the original scan time.

To increase the scan time, in some embodiments a new noise scan may be conducted with a correspondingly increased scan time to obtain the at least one updated candidate acquisition configuration.

In other embodiments, it is possible during the step of obtaining the sensor receive signal from the sensor system to obtain a sensor receive signal with a maximum scan time and consider only a portion of it initially. For example and in some embodiments, after the A/D conversion is conducted, only a portion of the sensor receive signal is processed further and forms the basis for the discussed decimation, namely with a minimum scan time, while the original sensor receive signal is stored. In these embodiments, it is possible to 'increase' the scan time by subsequently using a longer portion of the stored copy of the original sensor receive signal, i.e., with increased scan time. In some embodiments, the maximum scan time may be four times the minimum scan time.

In some embodiments, a predefined minimum output report rate for the sensor system may be given, or, inversely, a maximum duration for a scan cycle (i.e., the successive operation of one or more noise scans and an SN-scan) during which respective measurement data is acquired. This time available for a scan cycle is distributed over all individual measurements to be done during the scan cycle, including auxiliary measurements like a noise scan and at least one SN-scan. For example, for one individual measurement of an SN-scan we may thus yield a maximum scan time T. Given an AC with sampling frequency $f_s$, e.g. $f_s=2 \cdot f_c$ being twice the operating frequency or carrier frequency $f_c$, it is possible to fit up to $$\left\lfloor \frac{T}{1/f_s} \right\rfloor ADC$$

samples into time T. Hence, to fully exploit this available scan time T it is possible in some embodiments to set the number of samples to be acquired and processed, denoted herein the 'packet length' L, for the given AC to $$L = \left\lfloor \frac{T}{1/f_s} \right\rfloor.$$

In some embodiments and in case a finite input response (FIR) low-pass filter is employed to process the acquired data, the filter length may also be set to L in order to make use of all of the acquired data, and because a single output value for the data acquired during scan time T may be desired, while requiring the low-pass filter output to have settled. The vector of low-pass filter coefficients may be chosen, for example, to control the filter's spectral suppression in some embodiments. For example, the vector's first elements can be positive values smaller than the middle elements of the vector. For example, such a vector can be [0.05, 0.1, 0.2, 0.3, 0.2, 0.1, 0.05]. In some embodiments, the vector symmetric. For example, it is possible to choose a Hanning window of length L as the vector of low-pass filter coefficients. The n-th element of the Hanning window, as defined by Mathworks, is $$w_n = \sin\left(\frac{\pi(n+1)}{L+1}\right), 0 \leq n \leq (L-1)$$

In some embodiments, following the noise scan, the method comprises operating the sensor system during an SN-scan using the acquisition configuration determined during the noise scan. During the SN-scan, the sensor system may be operated to emit a stimulus signal to excite an alternating electric field, which then can be evaluated for the respective sensing application, such as a touch detection.

In some embodiments, the sensor system is operated during the SN-scan using the acquisition configuration of the latest noise scan in view that the acquisition configuration of the latest scan represents the most up-to-date configuration for a current noise scenario. In some embodiments, following the SN-scan, a further noise scan is conducted. The resulting cycled operation may be repeated until the sensing operation of the sensor system stops in some embodiments, such as when the sensor system is powered down.

In some embodiments, the method comprises subsequently conducting multiple noise scans between two SN-scans, wherein the multiple noise scans use predefined noise scan frequencies, wherein the predefined noise scan frequencies of at least some (or, e.g., all) of the multiple noise scans differ from each other. The present embodiments allow to further improve the determination of a noise-robust acquisition configuration, in particular when candidate acquisition configurations are to be evaluated that do not share a common multiple.

For example, it is possible to determine an overall acquisition configuration for operation of the sensor system from acquisition configurations obtained during the subsequently conducted multiple noise scans. In other words, a 'preferred' or 'best' overall acquisition configuration may be determined from the multiple acquisition configurations obtained in each run of a noise scan. In some embodiments, the overall acquisition configuration may be determined from the group of acquisition configurations, determined during the multiple noise scans, by comparing the associated noise measures and/or respective scan times.

Alternatively, in some embodiments, it is possible to conduct noise scans for, e.g., only two (or a different number of) predefined noise scan frequencies successively during a scan cycle, while keeping the one yielding the best AC, and cyclically looping over the remaining candidate noise scan frequencies to select the second one.

In some embodiments, the aperture time of the A/D conversion for determining the acquisition configuration (i.e., during the noise scan) is set to be substantially identical to, or an integer fraction of the aperture time of an SN-scan. In other words, an aperture time is predefined, or selected as desired, for the SN-scan according to the respective application (e.g., in terms of touch report rate) and the aperture time for the A/D conversion during the noise scan is set accordingly, i.e., identical or an integer fraction of the predefined aperture time. In the context of the present invention, the term "aperture time" generally is understood as the time duration for which an analog signal is input to a measurement system, i.e., the time during which the measurement system is exposed to the outside world and thus its internal analog state is changed by the analog input signal. In some embodiments, the aperture time relates to the time the sensor receive signal is input to the sensor interface of the sensor circuit, discussed in the following. In some embodiments, the aperture time relates to the time the sensor receive signal is input to the A/D converter of the sensor circuit, discussed in the following.

When the noise scan aperture time is identical to the SN-scan aperture time, it is possible to ensure to yield a relatively best carrier frequency decision. When the noise scan aperture time is an integer fraction of the SN-scan aperture time, and the noise is narrow-band, it is still possible to yield a best carrier frequency, though an absolute effective noise power estimate cannot be provided.

As the instant inventor has ascertained, for certain ratios between SN-scan and noise scan aperture times, it is possible to ensure to yield a relatively best carrier frequency decision. This is the case when the noise scan aperture time is either a) identical to the SN-scan aperture time, or b) when the noise scan aperture time is an integer fraction of the SN-scan aperture time or correspondingly, when the SN-scan aperture time is an integer multiple of the noise scan aperture time.

In some embodiments, (for a given base frequency $f^{(i)}$ with base frequency index i) the duration $L_\rho^{(i,j)} \cdot R^{(i,j)}/f^{(i)}$ is approximately the same for all index pairs (i,j).

In some embodiments, the method steps are conducted at least in part by a sensor circuit for a sensor system. In some embodiments, a (e.g., non-transitory) computer-readable medium is provided with contents that are configured to cause the sensor circuit to conduct the method steps as described herein.

According to another aspect, a sensor circuit to determine an acquisition configuration for operation of a sensor system is provided. The sensor circuit comprises, but is not limited to:

a sensor interface or input for obtaining a sensor receive signal from the sensor system;

an A/D converter to determine a digital receive signal from the sensor receive signal by A/D conversion of the sensor receive signal at a predefined noise scan frequency;

a decimation circuit, configured to determine a plurality of decimated digital receive signals by integer decimation of the digital receive signal using two or more decimation rates that differ from each other, wherein each of the two or more decimation rates is associated with a respective candidate acquisition configuration;

a noise evaluation circuit, configured to determine one or more noise measures for multiple of the candidate acquisition configurations using one or more of the plurality of decimated digital receive signals; and a configuration circuit, configured to determine the acquisition configuration for operation of the sensor system from the candidate acquisition configurations using the one or more noise measures.

In some embodiments, the sensor circuit according to the present aspect is configured according to one or more of the embodiments, discussed in the preceding with respect to the preceding aspect(s). With respect to the terms used and their definitions, reference is made to the preceding aspect(s).

According to another aspect, a capacitive touch sensing system (capacitive sensor) is provided. The capacitive touch sensing system of this aspect comprises:

one or more electrodes, configured for capacitive sensing; and a sensor circuit, connected to at least one of the electrodes; wherein the sensor circuit comprises:

a sensor interface or input for obtaining a sensor receive signal from the one or more electrodes;

an A/D converter to determine a digital receive signal from the sensor receive signal by A/D conversion of the sensor receive signal at a predefined noise scan frequency;

a decimation circuit, configured to determine a plurality of decimated digital receive signals by integer decimation of the digital receive signal using two or more decimation rates that differ from each other, wherein each of the two or more decimation rates is associated with a respective candidate acquisition configuration;

a noise evaluation circuit, configured to determine one or more noise measures for multiple of the candidate acquisition configurations using one or more of the plurality of decimated digital receive signals; and a configuration circuit, configured to determine the acquisition configuration for operation of the sensor system from the candidate acquisition configurations using the one or more noise measures.

In some embodiments, a sensor circuit according to the present aspect is configured according to one or more of the embodiments, discussed in the preceding with respect to the preceding aspect(s). With respect to the terms used and their definitions, reference is made to the preceding aspect(s). The term "capacitive touch sensing system" used herein is understood to comprise touch-less sensor systems, e.g., based on a detection of proximity.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Figure 2:
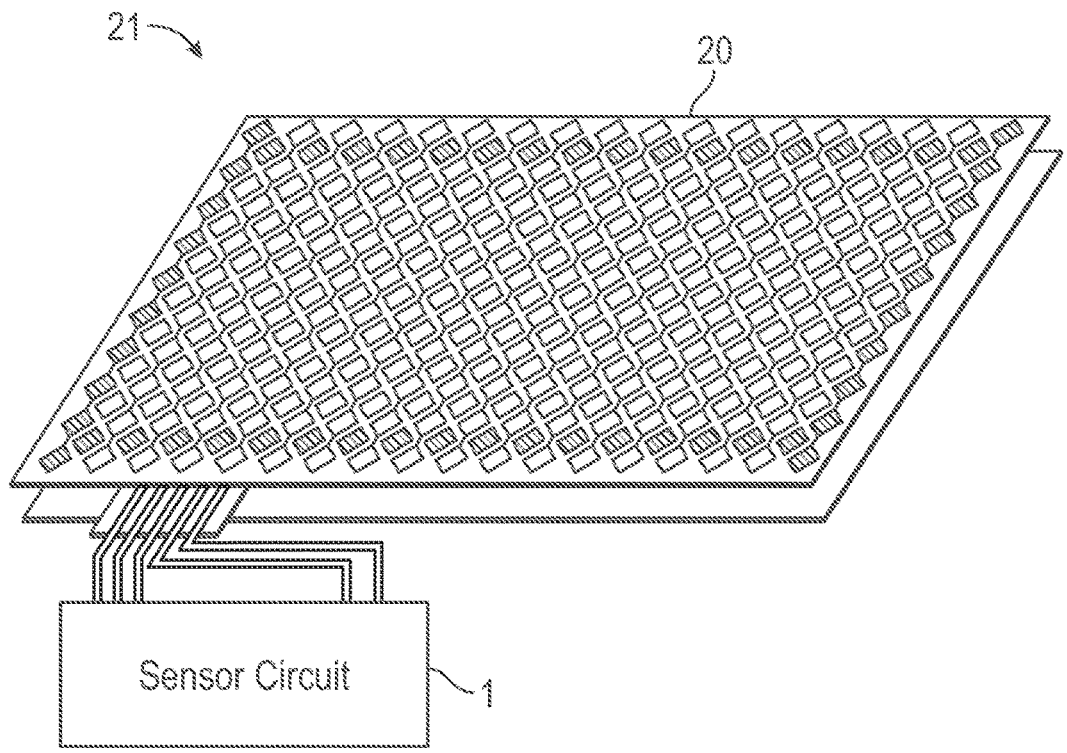
FIG. 2 shows an exemplary embodiment of a capacitive touch sensing system in a schematic view.

FIG. 1 shows a first exemplary embodiment of a sensor circuit 1 in a schematic block diagram. The sensor circuit 1 is adapted to operate a sensor system or a communication system (both not shown in FIG. 1). For example, a sensor 20 of a capacitive touch sensing system 21, shown schematically in FIG. 2, may be connected to sensor circuit 1. For the sake of the present discussion, reference will be made to capacitive touch sensing system 21, even though it is emphasized that the invention is not limited to capacitive touch sensing systems.

The exemplary sensor circuit 1 of the embodiment of FIG. 1 may be embodied by a microcontroller, with hardware/software that provides the following operation and components. For improved clarity, the microcontroller itself is not shown in the schematic block diagram of FIG. 1.

The sensor circuit 1 comprises a sensor interface 2, which is connectable to the sensor 20 of capacitive touch sensing system 21, using sensor connections 3. Capacitive touch sensing is known, for example, for use in capacitive touch screen panels of electronic devices, such as computers, tablets, smart phones, wearables, and smart home equipment, and electronic components for vehicles, trains, ships, air-/spacecraft, and industrial or scientific equipment, without limitation. In one example, the capacitive touch sensing system 21 is a 'touch-less' sensor system.

The sensor interface 2 and sensor connections 3 allow the sensor circuit 1 to operate/drive the sensor 20 of capacitive touch sensing system 21 during acquisition operation, which is referred to herein as 'signal-and-noise scan', or SN-scan. During an SN-scan, the sensor circuit 1 or more precisely a drive circuit 4 of sensor circuit 1 creates and transmits a stimulus signal to excite an alternating electric field near the sensor 20 of capacitive touch sensing system 21, which then yields the information part at the receive side, namely with respect to the capacitive touch sensing, whether one or more fingers of a user or a different object are detected close to the surface of sensor 20. Both, the transmission of the stimulus signal and the reception of a returning sensor receive signal is handled by sensor interface 2. For the purposes of the present discussion and by way of example, the stimulus signal is a periodic signal, namely a rectangular pulse train. The frequency of this periodic signal, i.e., the pulse frequency, is referred to as the operating frequency or carrier frequency of the SN-scan.

In addition to the acquisition operation, sensor circuit 1 conducts noise scans in a corresponding noise scan mode. During a noise scan, preferably no stimulus signal is applied to the sensor by the sensor circuit 1.

The noise scans, as discussed in the preceding, serve as test measurements and allow computation of noise measures from measurement data obtained during the noise scans, which are representative of the amount of noise to be expected during an SN-scan. Robustness to noise is a key challenge for any communication system or sensor system, including capacitive touch sensing system 21. Particularly, the passing of standard IEC conducted noise tests, e.g., with amplitude modulated noise as in IEC 61000-4-6, bulk current injection (BCI) tests, e.g. according to the ISO 11452-4 automotive standard, or robustness to square noise is addressed. Further, for various applications of the capacitive touch sensing system 21, it is important to yield a high touch report rate with reliable and accurate output estimates.

A goal of conducting the noise scans is to determine an acquisition configuration for operation of the capacitive touch sensing system 21 during an SN-scan. The acquisition configuration comprises one or more parameters for the operation of the capacitive touch sensing system 21 during an SN-scan and may comprise one or more of a sampling frequency for A/D conversion, an operating frequency (carrier frequency) of the stimulus signal for (acquisition) operation of the sensor system, scan duration, a number of samples to be acquired, and low-pass filter coefficients.

It is noted that for the present discussion, the sampling frequency for A/D conversion during an SN-scan is considered to be related to the operating frequency/carrier frequency of the stimulus signal. One reason for this relationship is that the sensor receive signal in the present embodiment is a quasi-static signal, i.e., a signal which does not, or only hardly, changes over time during given time intervals, in view of the stimulus signal in the shape of a rectangular pulse train. On the receive or sensing side and as discussed in the following, when the signal has experienced low-pass filtering, its edges are rounded and after each edge it shows a transition duration until it settles to a constant level. Herein, the received signal is sampled once after each edge when the signal has settled to a sufficient extent, i.e., there are two samples per period of the rectangular pulse train during the SN-scan, thus corresponding to the sampling frequency being twice the carrier frequency.

Sensor circuit 1 further comprises A/D converter 5, digital signal processing circuit 15, noise evaluation circuit 8, configuration circuit 9, memory 10, touch detector 11, and output 12. The digital signal processing circuit 15 comprises in particular a decimation circuit (not shown in FIG. 1) that is configured to determine a plurality of decimated digital receive signals, as discussed in more detail in the following. It is noted that FIG. 1 does not show all control connections between the aforementioned components, e.g., for controlling the sampling rate of A/D converter 5 or access of memory 10 by signal processing circuit 15.

During a noise scan, the signal processing chain of A/D converter 5, digital signal processing circuit 15, noise evaluation circuit 8, and configuration circuit 9 is active.

During the SN-scan, the noise evaluation circuit 8, and the configuration circuit 9 are disabled, or inactive. In this case, the sensor receive signal, after A/D conversion and signal processing is provided to touch detector 11 for determination of a user touch on the sensor 20. The result is provided to a connected external component via output 12.

The functionality of sensor circuit 1 and its components will in the following be explained referring to FIG. 1 and the flow diagram FIG. 3.

For simplicity of illustration, it is assumed that exemplary capacitive touch or touch-less sensing system 21 has a multitude of acquisition configurations, whose analog front-end parameters are equal but for the operating frequencies and the respective sampling frequencies, the latter of which, as discussed in the preceding, are twice the carrier frequencies in this exemplary embodiment. The different sampling frequencies have a common multiple, which is the pre-defined noise scan frequency. Other, digital signal processing parameters, like the number of samples to be filtered and the choice of low-pass filter coefficients, may or may not differ between these ACs.

A noise scan begins in step 30 with the initialization/power-up of sensor circuit 1. In step 31, the sensor receive signal is obtained from the sensor 20 using the sensor interface 2, as discussed in the preceding, without a stimulus signal being applied. The signal thus only comprises noise.

The sensor receive signal subsequently in step 32 is A/D converted using the A/D converter 5 to obtain a digital sensor receive signal. During the noise scan, data is acquired at a frequency $f_b$, which we denote as the base frequency or predefined noise scan frequency. During a configuration step (not shown), $f_b$ is chosen to be a common multiple of the SN-scan sampling frequencies of a multitude of ACs. Let one of these ACs, for example, have a candidate carrier frequency $f_c$. During an SN-scan with this AC, the sampling frequency would be $f_s = 2 \cdot f_c$. The predefined noise scan frequency, however, is R times higher, namely $f_b = R \cdot 2 \cdot f_c$, where R is a decimation rate. The A/D converter 5 thus samples the analog sensor receive signal during the noise scan at sampling frequency $f_b = 2 \cdot R \cdot f_c$, i.e., the sampling frequency is R times higher than for the SN-scan.

In step 33, decimated digital receive signals are generated by the decimation circuit of digital signal processing circuit 15 from the digital sensor receive signal.

Figure 4:
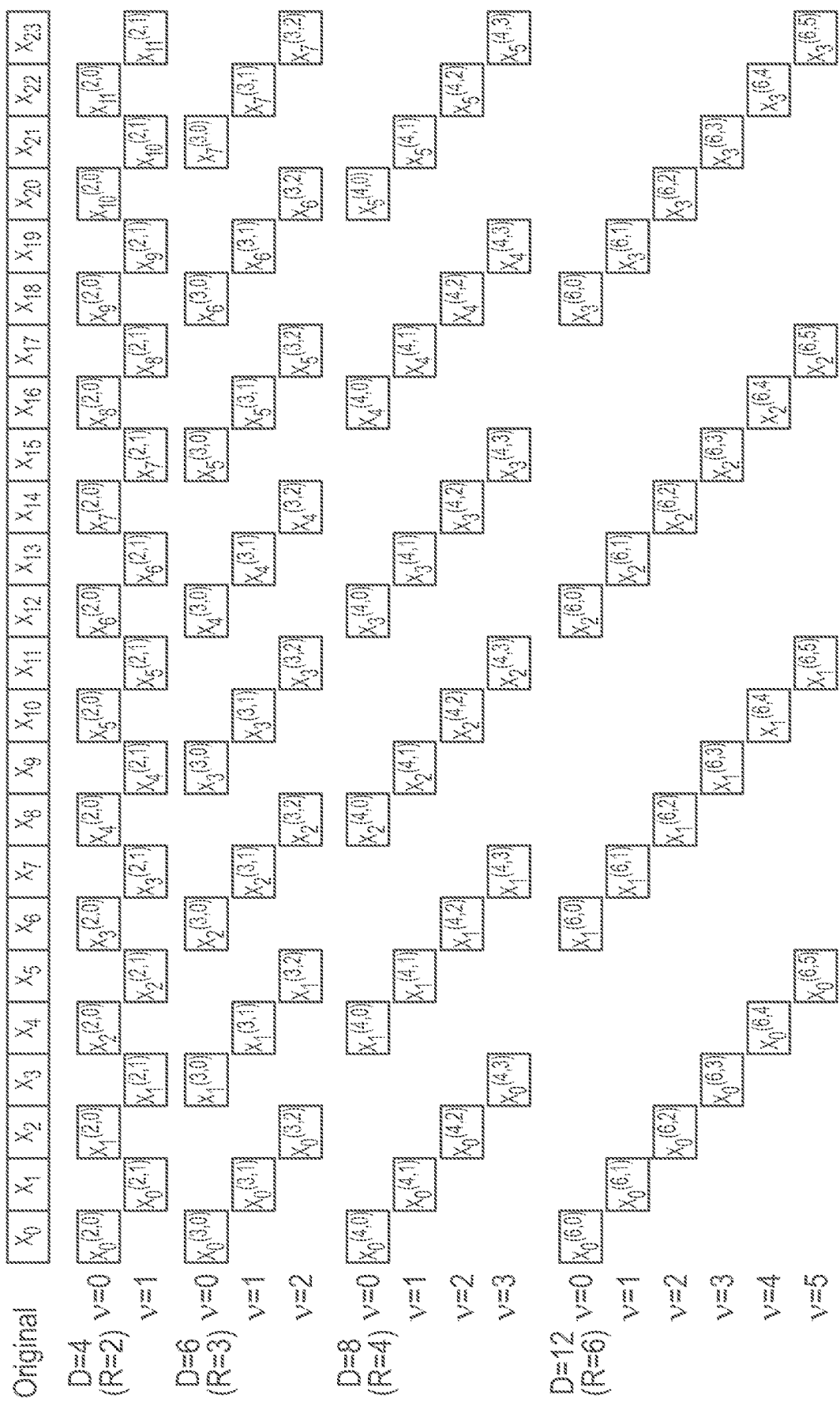
FIG. 4 schematically illustrates the functionality of a decimation circuit of the sensor circuit of FIG. 1.

Decimation of the digital sensor receive signal reduces the number of samples in the respective decimated digital receive signal. FIG. 4 schematically shows the operation of the digital signal processing circuit 15 for exemplary decimation rates R=2, 3, 4, and 6.

The decimation uses multiple different decimation rates, namely as shown in FIG. 4, decimation rates R=2, 3, 4, and 6. For each decimation rate, multiple decimated digital receive signals are provided, which will be discussed in more detail in the following.

The application of decimation with multiple decimation rates allows that multiple possible 'candidate' acquisition configurations can be evaluated from the same measurement data, i.e., the digital sensor receive signal. As discussed in the preceding, the (candidate) acquisition configurations in this embodiment have sampling frequencies of which the noise scan sampling frequency is a common multiple. Low-pass filter lengths and coefficient values may differ as well in some examples. Decimation of the noise scan digital sensor receive signal with multiple decimation rates provides decimated digital receive signals with these different sampling frequencies and thus makes it possible to evaluate the different candidate acquisition configurations using the same sensor receive signal. As will be apparent from the example in FIG. 4, while the scan duration is constant (namely $L^{(i)}=24$ samples), the number of samples in the decimated digital receive signals, which is equal to the packet length L of the respective AC, varies depending on the decimation rate. In some embodiments, the scan duration for different ACs can be different. For example, if the noise scan would yield 20 samples in total, R=4 would result to 4*5=20 samples, but with R=3, there would only be 3*6=18 samples, because 3*7=21 does not 'fit' into the original sample length of 20.

Once decimated digital receive signals are generated, in step 34, the digital signal processing circuit 15 demodulates the decimated digital receive signals. This is conducted herein, without limitation, by multiplication of the samples alternatingly with plus one and minus one as it would also be done during an SN-scan. After demodulation, digital low-pass filtering, e.g., using one or more finite impulse response (FTR) filters, removes unwanted high frequency signal components. It is noted that different decimation rates R may require differences in the further processing, in particular, the number of filter coefficients of the FIR filters may be equal to the number $L_\rho^{(i,j)}$ of samples after decimation, i.e. equal to the packet length L of the respective candidate AC, and the values of the filter coefficients may differ for different decimation rates R accordingly. In the present embodiment, filtering is applied using a Hanning window of length L as the vector of low-pass filter coefficients. The n-th element of the Hanning window, as defined by Mathworks, is $$w_n = \sin\left(\frac{\pi(n+1)}{L+1}\right), 0 \le n \le (L-1)$$

After the filtering, a further decimation by $L_\rho^{(i,j)}$ is applied to provide a single output value for a block of acquired ADC samples. The resulting digital processing chain of the digital signal processing circuit 15 is discussed in more detail in the following with reference to FIG. 5, where for simplicity $L_\rho^{(i,j)}$ is abbreviated as L.

Evaluation is done in step 35 by the noise evaluation circuit 8 that determines noise measures for the candidate acquisition configurations from the decimated digital receive signals.

As mentioned in the preceding, for each decimation rate, a group of decimated digital receive signals is determined. For example, and as shown in FIG. 4, the top shows the original ADC 5 output signal with $L^{(i)}=24$ samples $x_k$, k=0, 1, . . . , 23. Below it shows for decimation rates R=2, 3, 4, 6 how the single original ADC signal is demultiplexed into R signals with different starting samples $x_v$, v=0, 1, . . . , R−1. Hereby, the samples of the decimated signals are renamed as $x_n^{(R,v)} = x_{v+n \cdot R}$. That is, for the exemplary values of $L^{(i)}=24$ samples and R=2, 3, 4, 6 in FIG. 4, we yield decimated signals of lengths 12, 8, 6, and 4 samples, respectively.

As can be seen from FIG. 4, for decimation rate R=3, a total of three decimated digital receive signals are determined, which show different starting phases, i.e., different starting samples. This is done to calculate a particularly beneficial noise measure in step 35, namely an 'effective noise power estimate', also referred to as 'ENPE'.

Figure 3:
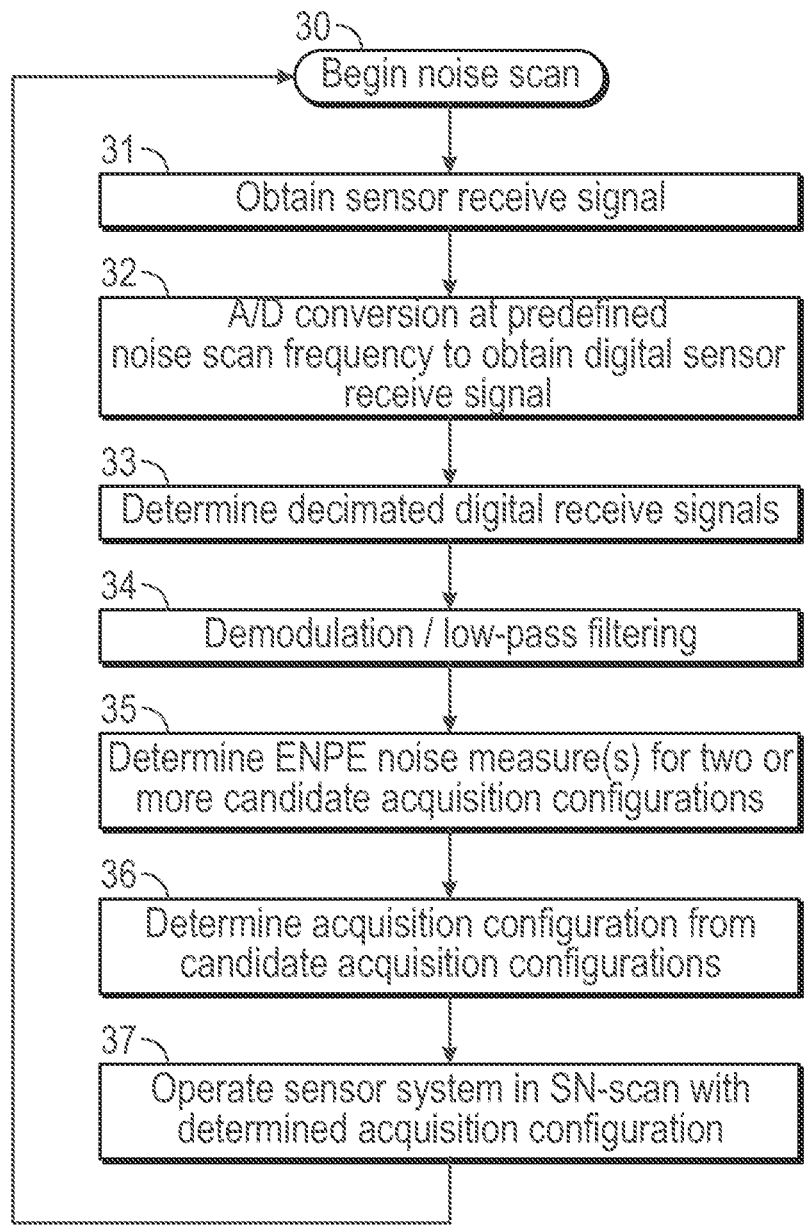
FIG. 3 illustrates the functionality of the sensor circuit of FIG. 1 in an exemplary flow diagram according to a first embodiment.

Accordingly, the process of FIG. 3 provides that, in the digital domain, the digital receive signal is decimated using different signal phases $v \in \{0, 1, \ldots, R-1\}$, where each of the resulting R signals has sampling rate $f_s = f_b/R$. It is noted, that in some embodiments, the set of employed signal phases can also be a subset of the full set of phases $\{0, 1, \ldots, R-1\}$, for example $\{0, 2, 4, \ldots, R-1\}$. In other words, each group of decimated digital receive signals does not necessarily comprise all possible signal phases.

Mathematically, each decimation rate R is assigned a coefficient vector with the same length as the decimated signals, for example containing the coefficients of an FIR low-pass filter (LPF). To compute an ENPE for a decimation rate R, for each of the up to R decimated signal vectors the dot product with the assigned coefficient vector is computed in step 35 by noise evaluation circuit 8. Optionally and in some embodiments, these dot products may be normalized by dividing by the sum of all coefficients. Then the average of the squared normalized dot products is computed to yield the ENPE.

In mathematical terms, FIG. 4 shows how for each $R \in \{2,3,4,6\}$ the original signal vector $x = [x_0 x_1 x_2 \ldots x_{23}]$ is split into up to R signal vectors $$x^{(R,v)} = \left[ x_v x_{v+R} x_{v+2R} \ldots x_{v+\left(\frac{L}{R}-1\right) \cdot R} \right] = \left[ x_0^{(R,v)} x_1^{(R,v)} x_2^{(R,v)} \ldots x_{\frac{L}{R}-1}^{(R,v)} \right]$$

where we denote $x_n^{(R,v)} = x_{v+n \cdot R}$, and $v \in \{0, 1, \ldots, R-1\}$. Let $w = [w_0 w_1 w_2 \ldots w_N]$ denote the coefficient vector of length $(N+1) = L^{(i)}/R$ which is assigned to each decimation rate R. The ENPE $\eta(x, R, w)$ for a receive signal at carrier frequency $f_c$ which is sampled at $f_s = 2 \cdot f_c$, demodulated and filtered with the coefficients is then computed from the noise scan data vector x sampled at base frequency $f_b = R \cdot 2 \cdot f_c$, decimation rate R and coefficient vector w as $$\eta(x, R, w) := \frac{1}{R} \cdot \sum_{v=0}^{R-1} \left( \frac{1}{\sum_{n=0}^{N} w_n} \cdot \sum_{n=0}^{N} x_{n \cdot R+v} \cdot (-1)^n \cdot w_n \right)^2.$$

Hereby, the term $$\left( \frac{1}{\sum_{n=0}^{N} w_n} \cdot \sum_{n=0}^{N} x_{n \cdot R+v} \cdot (-1)^n \cdot w_n \right)^2$$

is referred to as phase-instantaneous noise measure. The normalization term $$\frac{1}{\sum_{n=0}^{N} w_n}$$

ensures a filter DC gain of 1 and can be moved out of the sum over the phases v—then being squared—or can be considered in a later processing step, leaving $$\eta'(x, R, w) := \frac{1}{R} \cdot \sum_{v=0}^{R-1} \left( \sum_{n=0}^{N} x_{n \cdot R+v} \cdot (-1)^n \cdot w_n \right)^2.$$

To distinguish the different decimation rates R, we assign a superscript with index j=0, 1, 2, ... for the j-th decimation rate $R^{(0,j)}$. Likewise, we do for the coefficient vector assigned to decimation rate $R^{(0,j)}$, yielding $w^{(0,j)}$.

Because the same measurement data is used to compute noise measures for different candidate ACs, temporal changes experienced, for example, with amplitude modulated noise do affect the noise measures, but the noise measures computed from the same data still remain comparable to reliably identify the AC with the relatively lowest noise measure.

For decimation rates which are a multiple of two, computational complexity can be reduced by changing the sum over the phases v=0, 1, ..., R-1 into the sum over the phases $v=v_0$, $v_0+R/2$ where $v_0 \in \{0, 1, \ldots, R/2-1\}$. For example, for R=6, one can employ $$\eta''(x,6,w) := \frac{1}{6} \cdot \sum_{v=v_0,v_0+3} \left( \frac{1}{\sum_{n=0}^{N} w_n} \cdot \sum_{n=0}^{N} x_{n \cdot 6+v} \cdot (-1)^n \cdot w_n \right)^2,$$

$v_0 \in \{0,1,2\}$ to compute a complexity-reduced ENPE.

Once the noise measures, i.e., the ENPEs herein, are determined for each candidate acquisition configuration, the ENPEs are passed to configuration circuit 9, which selects the acquisition configuration for operation of the sensor system from the candidate acquisition configurations using the determined ENPEs in step 36.

In this embodiment, the configuration circuit 9 determines in step 36, which of the candidate acquisition configurations yields the lowest noise by evaluating the associated ENPEs.

Once a candidate acquisition configuration is selected as acquisition configuration, the noise scan is complete. The acquisition configuration is provided to drive circuit 4 by the configuration circuit 9. In addition, the selected acquisition configuration is stored in memory 10 for future reference. The capacitive touch sensing system 21 is then operated in at least one SN-scan (step 37) according to the results of the noise scan. It is noted that an SN-scan may be conducted for multiple sensor (transmit) lines 3, particularly in case of mutual-capacitance sensors. After the SN-scan(s), a new noise scan is conducted, beginning with step 30.

Figure 5:
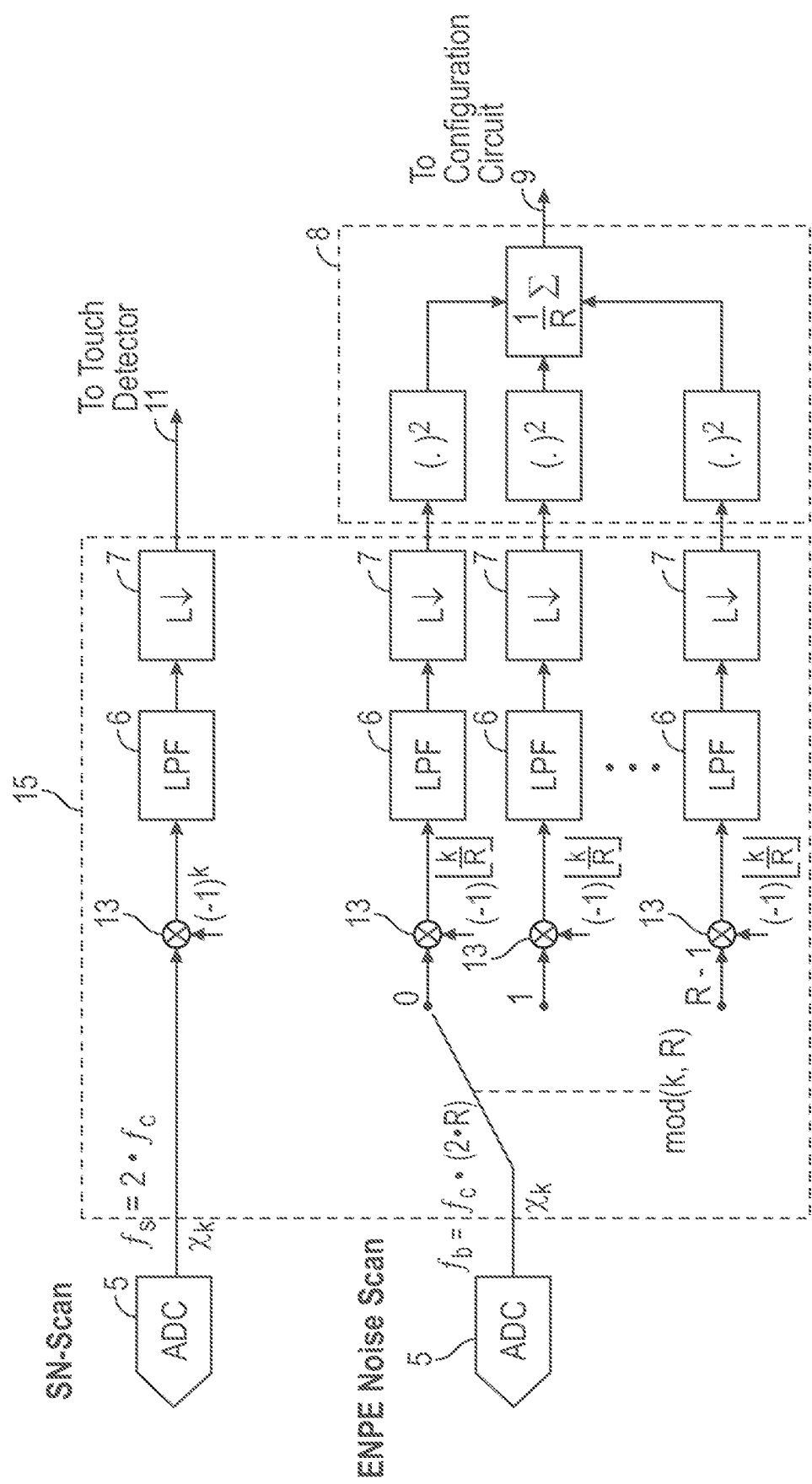
FIG. 5 schematically illustrates two signal processing chains for a noise scan and an SN-scan.

The two resulting signal processing chains for the noise scan and the SN-scan are shown in FIG. 5 in a simplified and schematic diagram.

In the top, FIG. 5 shows the digital processing for data acquired during an SN-scan. The sensor receive signal is converted from the analog to digital domain at twice the carrier frequency $f_c$, i.e. $f_s = 2 \cdot f_c$, using the ADC 5 to obtain the digital sensor receive signal. The digital ADC output signal, i.e. the digital sensor receive signal, is then provided to the digital signal processing circuit 15, which comprises a demodulator 13, an FIR low pass filter 6, and a decimation circuit 7. The digital ADC output signal, i.e. the digital sensor receive signal, is demodulated by the demodulator 13 by multiplying its samples alternatingly with plus and minus one, and the demodulated signal is input into the digital low-pass LPF filter 6 with L filter coefficients and finally decimated with factor L, i.e., only one sample is output of the decimator 7 after inputting L samples.

In the bottom part of FIG. 5, the processing of the digital processing circuit 15 and the noise evaluation circuit 8 during the noise scan is shown in more detail. The ADC 5 is sampling the analog sensor receive signal at the predefined noise scan frequency. In FIG. 5, the processing of one exemplary AC is shown. The operation would be conducted for each AC to be considered.

The exemplary AC has a carrier frequency $f_c=f_b/(2\cdot R)$. The sampled signal after conversion to obtain the digital sensor receive signal by ADC 5, is demultiplexed onto R signals indexed with $v \in \{0, 1, \ldots, R-1\}$, where each of the R signals has sampling rate $f_s=2\cdot f_c$. Comparable to the processing during the SN-scan and to provide conditions, similar to those in an SN-scan, each of the demultiplexed signals is demodulated by a respective demodulator 13 by multiplying its samples alternatingly with plus and minus one, and each demodulated signal is being filtered in an FIR low-pass filter LPF 6 and decimated by decimation circuit 7. After analog-to-digital conversion and processing R·L samples $x_k$, for each decimated signal we have obtained one decimated sample. Each decimated sample is squared by noise evaluation circuit 8 and then the average of these R squared samples is computed by noise evaluation circuit 8, yielding an ENPE.

It is noted that the processing, discussed with reference to FIGS. 3 and 5 in the preceding, does not necessarily need to be completed 'online'. Instead, and as discussed in the preceding with reference to FIGS. 3-5, where each ADC sample $x_k$ may be discarded as soon as it has been multiplied with (±1) yielding the demodulated value as an intermediate product, in an embodiment, the samples $x_k$ may be stored in memory 10 for offline processing. In this embodiment, the processing, discussed with reference to FIGS. 3 and 5, is initiated after A/D conversion.

Figure 6:
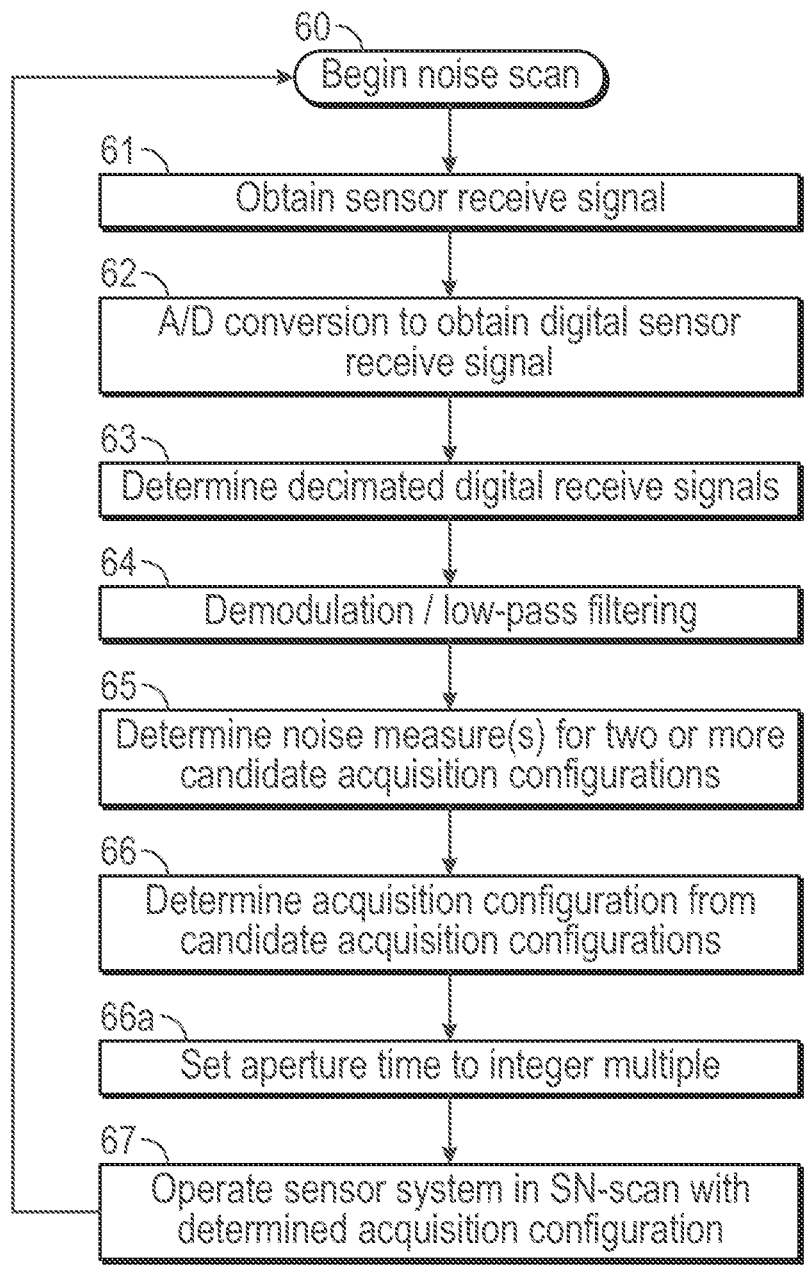
FIG. 6 illustrates the functionality of the sensor circuit of FIG. 1 in an exemplary flow diagram according to a second embodiment.

FIG. 6 shows an exemplary flow diagram of the operation of sensor circuit 1 in another embodiment. The operation corresponds to the preceding discussion, in particular referring to FIG. 3. Accordingly the operation in steps 60-67 corresponds to the operation in respective steps 30-37, except for step 66a, in which configuration circuit 9 sets the aperture time of the acquisition configuration that is used by drive circuit 4 for the SN-scan, to an integer multiple of the aperture time (including identical aperture times, i.e. where the integer=1), used by A/D converter 5 during the current noise scan. To do so, configuration circuit 9 is connected to A/D converter 5 (not shown in FIG. 1). The aperture time is set back to the original aperture time in step 60 upon the next noise scan cycle.

Figure 7:
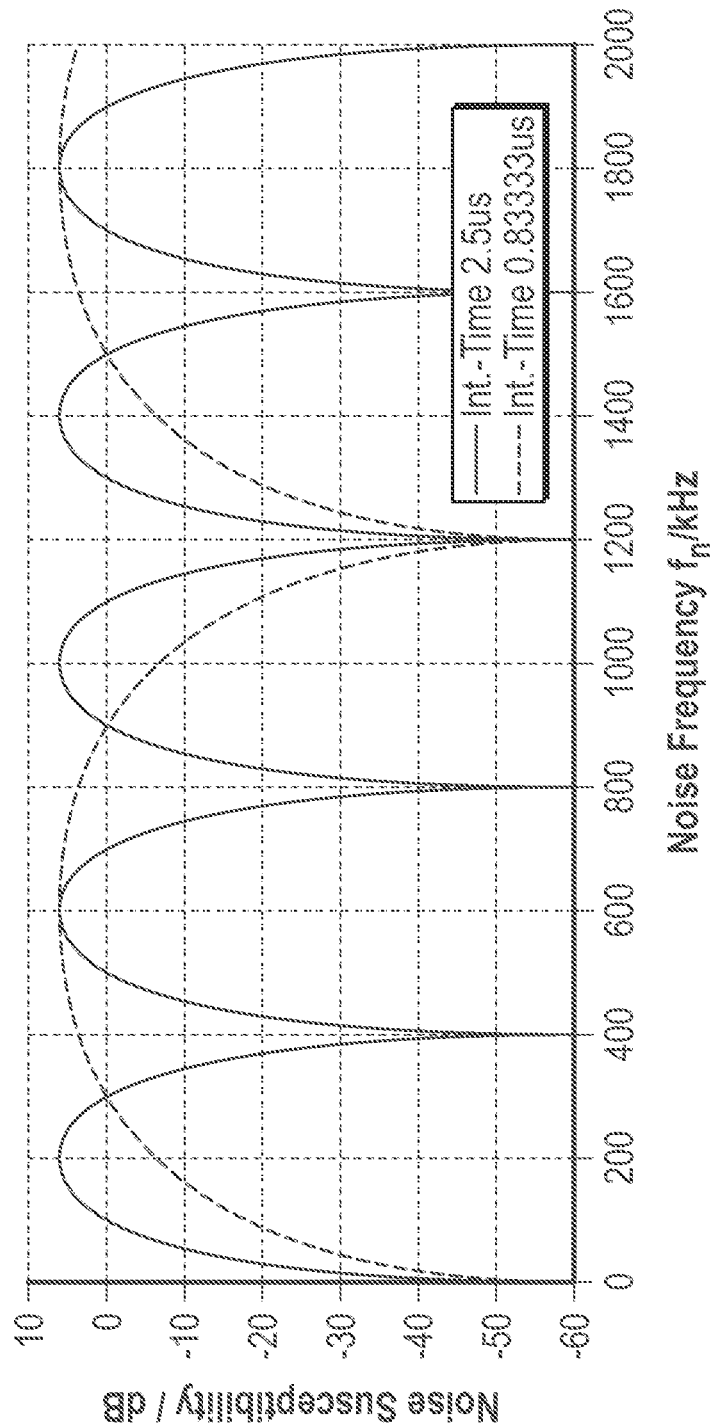
FIG. 7 shows exemplary magnitudes of an ideal ADC's transfer function in a schematic diagram.

The present embodiment is based on the inventor's recognition that, when capturing analog data to create a time-discrete sample, the time duration for which the analog signal is input to the measurement system, i.e., the time during which the measurement system is exposed to the outside world and thus its internal analog state is changed by the analog input signal, can affect the output sample's value. For ADC 5 this time duration is the so-called 'aperture time'. The schematic diagram of FIG. 7 shows the magnitude of an ideal ADC's transfer function, also referred to as susceptibility to single-tone signals with frequency $f_n$, for aperture times 0.833 us and 2.5 us. Spectral zeros can be observed at multiples of the inverse aperture times, i.e., 1/0.833 us=1.2 MHz and 1/2.5 us=400 kHz, respectively.

With some touch sensing devices, upon sensing an electrode, an electrical current flowing to or from a sensor electrode is being integrated for a deterministic amount of time. This integration time also is considered to be an aperture time.

The aperture time cannot be longer than the time between two successive samples, the sample interval, because the aperture time windows of two successive samples cannot overlap. The higher the sampling frequency, the shorter the sample interval and thus the shorter the maximum aperture time. Hence, when sampling at the predefined noise scan frequency $f_b=2\cdot R\cdot f_c$, where $f_c$ is the carrier frequency of an exemplary AC, the maximum aperture time $1/(2\cdot R\cdot f_c)$ is shorter than during an SN-scan where the sampling frequency is $1/(2\cdot f_c)$.

A desired aperture time may also depend on the sensor type at hand. For example, signal settling times are typically higher for ITO sensors than for PCB sensors due to the lower conductivity of ITO compared to copper. Therefore, a longer aperture time may be desired for an ITO sensor compared to a similarly shaped PCB sensor. It is noted that there are also cases where the aperture time has a practically negligible effect onto the measurement values. These may include, for example, voltage measurements done on the output of a voltage follower circuit ('buffer amplifier').

It is however possible in certain scenarios that a desired aperture time is shorter than the SN-scan sample interval but exceeds the noise scan sample interval. Then, obviously, the desired aperture time is not applicable to the noise scan. A different, shorter aperture time may be chosen for the noise scan. Choosing different aperture times for SN-scan and noise scan may however possibly compromise the potential to yield a reliable ENPE from noise scan data for an SN-scan. Particularly, when the noise scan susceptibility spectrum has zeros at frequencies where the SN-scan susceptibility spectrum does not, it is possible that harmful noise is not being seen in noise scan data and a noise robustness algorithm may make insensible decisions.

For certain ratios between SN-scan and noise scan aperture times, however, it is possible to yield a relatively best carrier frequency decision, i.e., decision about a relatively best acquisition configuration for some noise scenarios. This is the case when the noise scan aperture time is an integer fraction of the SN-scan aperture time or correspondingly, when the SN-scan aperture time is an integer multiple of the noise scan aperture time. This is shown by way of example in FIG. 7 for the fraction ⅓ when all 'noise-scan zeros' (integration time 0.833 us) fall onto 'SN-scan zeros' (integration time 2.5 us).

The ENPE provides an absolute estimate for the noise power of a received signal after demodulation and low-pass filtering. For some sensor systems or applications there may be an upper threshold for this noise power above which operation is not desirable.

Figure 17:
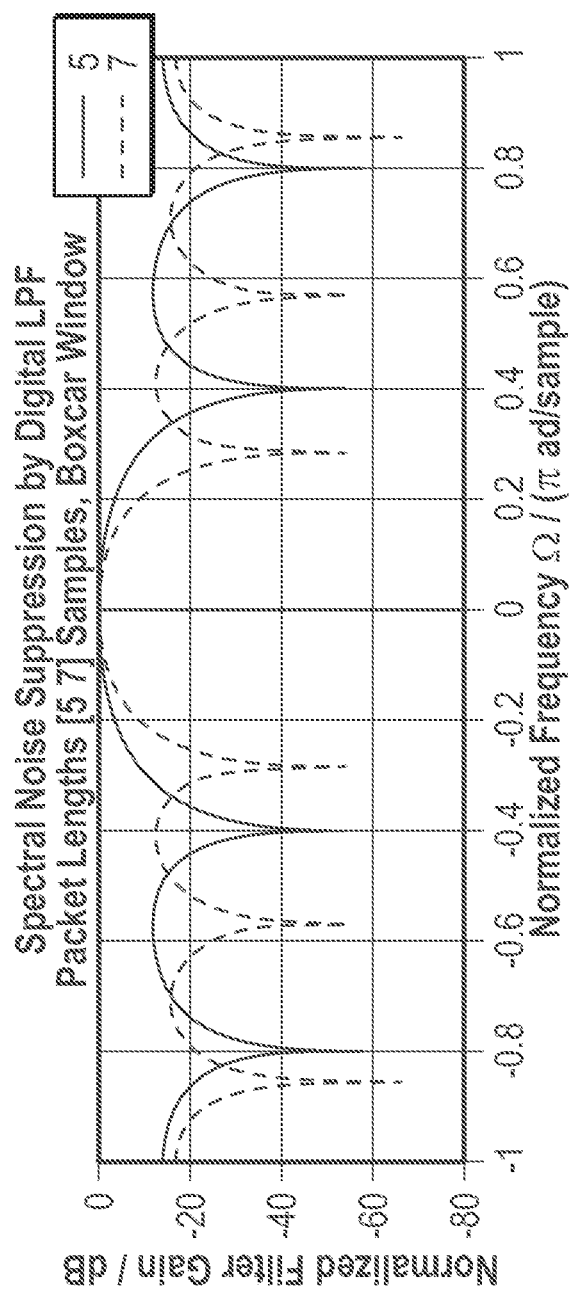
FIG. 17 illustrates spectral noise suppression by digital LPF for two packet lengths.
Figure 17:
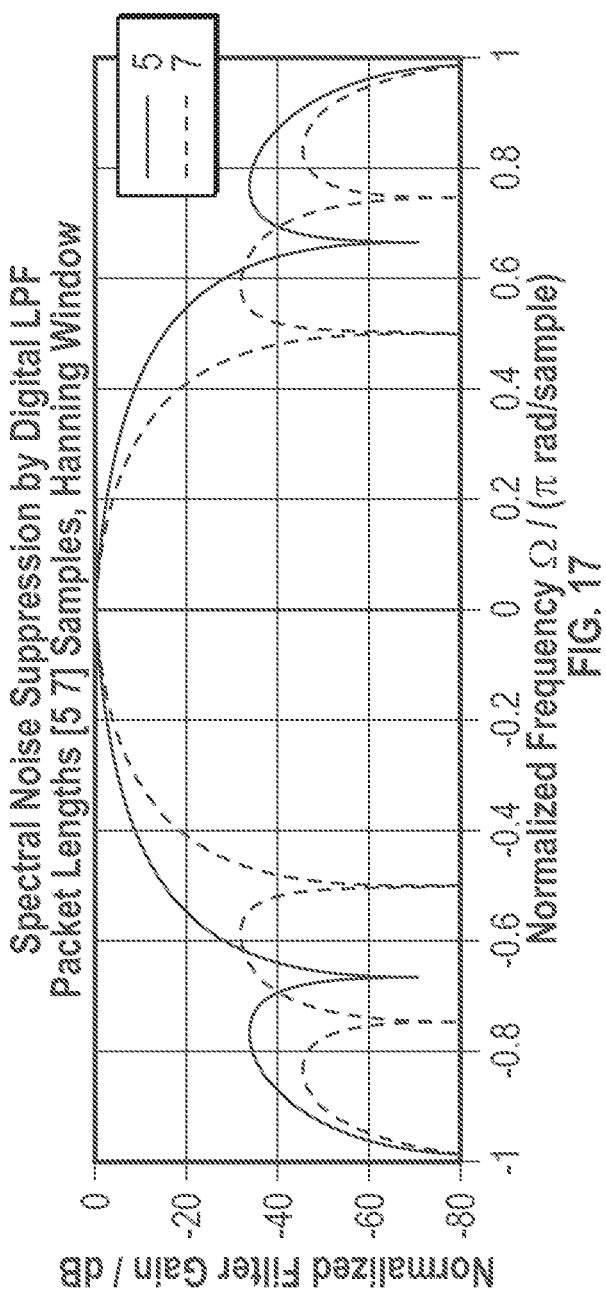

One exemplary approach to yield a lower noise power is to increase the number L of acquired and processed samples, denoted herein the 'packet length', and thus the filter length equal to L. Note that the filter length is equal to the filter order N plus one, i.e. L=N+1. However, increasing the packet length alone and by itself does not generally improve noise suppression. Noise suppression is dependent primarily on the chosen low-pass filtering of which the packet and filter length is only one aspect. FIG. 17 shows an example of the spectral noise suppression in case the packet size is increased from 5 to 7 samples for boxcar window and Hanning window. For example, in the top plot with boxcar window, the noise susceptibility is increased for the normalized frequency $$\Omega := \frac{2\pi f}{f_s} = 0.4\pi$$

radians/sample, not decreased.

Figure 9:
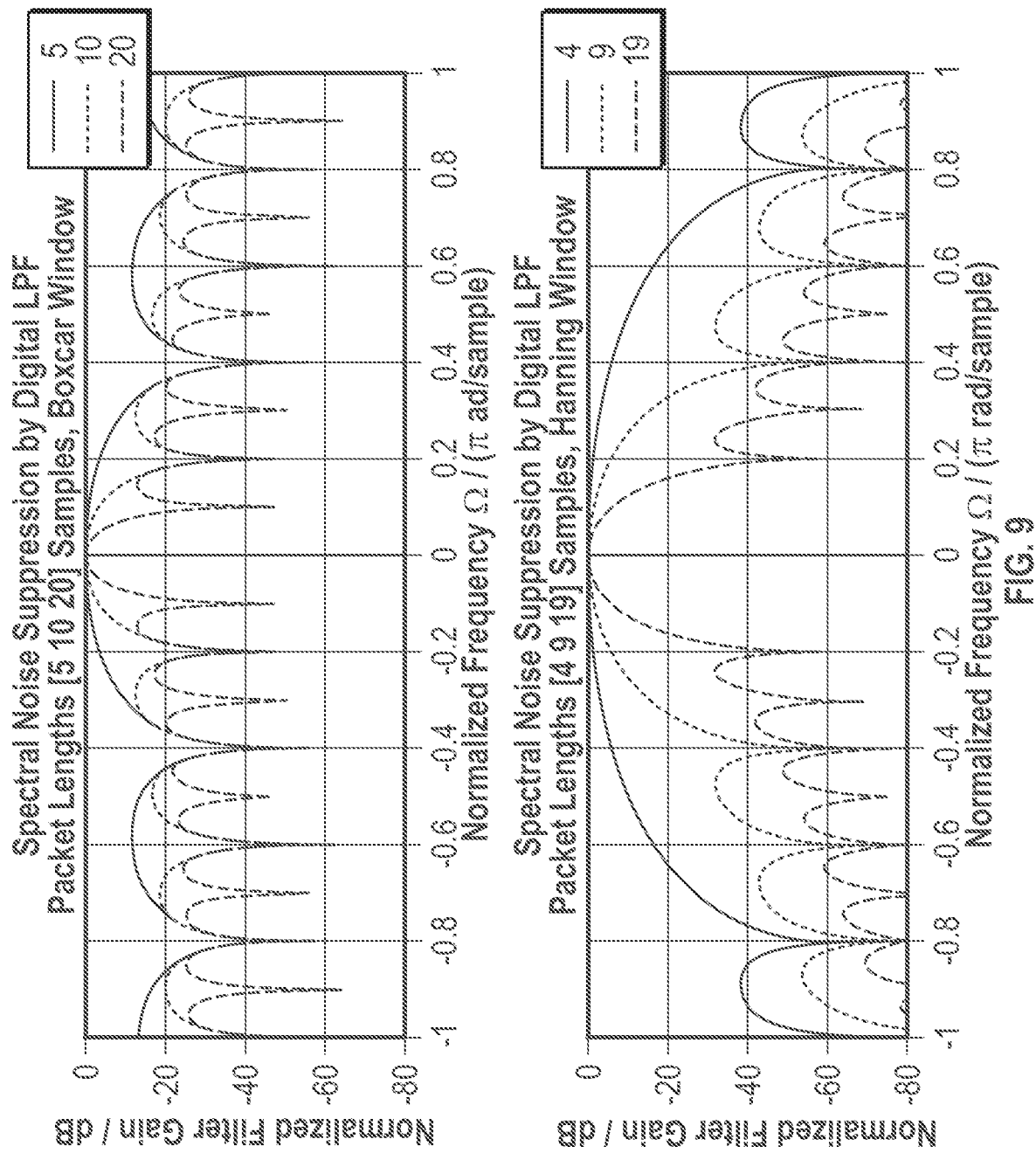
FIG. 9 illustrates spectral noise suppression by digital LPF.

FIG. 9 shows for boxcar or rectangular window low-pass filters (top) and 'hanning' window low-pass filters (bottom) how the packet length needs to be increased such that noise suppression is improved for all noise frequencies $f=f_n$, or all normalized frequencies $$\Omega = \frac{2\pi f}{f_s}$$

in FIG. 9. Particularly, spectral zeros for shorter packet lengths should fall onto zeros for longer packet lengths. In FIG. 9 it is shown that this is achieved when, for a boxcar window LPF, the longer packet length is a multiple of a shorter packet length, and for a Hanning window LPF the longer packet length is a multiple of a shorter packet length plus one. For boxcar, Hann window, and Matlab's Hanning window (a Hanning window herein corresponds to a Hann window with the first and last sample removed) low-pass filters the rule how to increase a packet length L to L' in order to guarantee improved noise suppression for all noise frequencies is $$L' = \begin{cases} k \cdot L: & \text{boxcar window} \\ k \cdot L - (k-1): & \text{Hann window} \\ k \cdot L + (k-1: & \text{'hanning' window} \end{cases}, k = 1, 2, 3, \ldots$$

Another requirement for sensor systems may be a minimum report rate, i.e., capacitive touch or touch-less sensing system 21 may be required to output estimated data at a report rate equal to, or higher than, a minimum report rate. This estimated data can, for example, be low-pass filtered and decimated data as is illustrated in FIG. 5 (top) as "to touch detector 11", or data computed therefrom. Such a minimum report rate typically is independent of how the reported data is acquired and processed, that is, it is, for example, independent of the carrier frequency. But the minimum report rate sets the upper limit for the measurement time to the inverse of the minimum report rate. Another requirement for capacitive touch sensing system 21 may be a minimum SNR, or in other words that the expected noise power of an output value is below a limit. In some embodiments, this may even be the primary requirement, and when it cannot be fulfilled with a desired report rate, then the report rate is reduced (i.e., the scan is time increased) while maintaining—and trying to meet—the noise power limitation, as is discussed in the following with reference to FIGS. 8A and 8B.

Figure 8A:
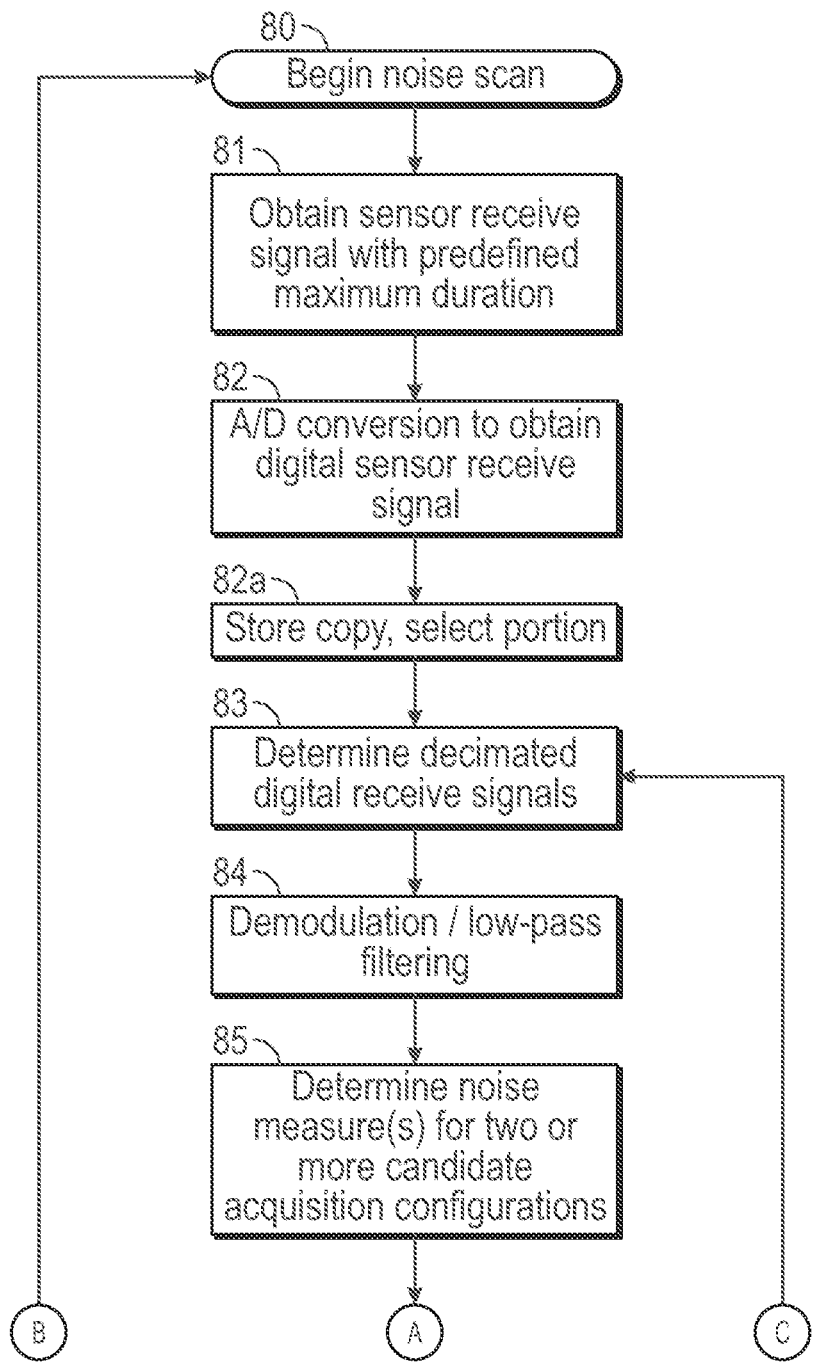
FIGS. 8A and 8B illustrates the functionality of the sensor circuit of FIG. 1 in an exemplary flow diagram according to a further embodiment.
Figure 8B:
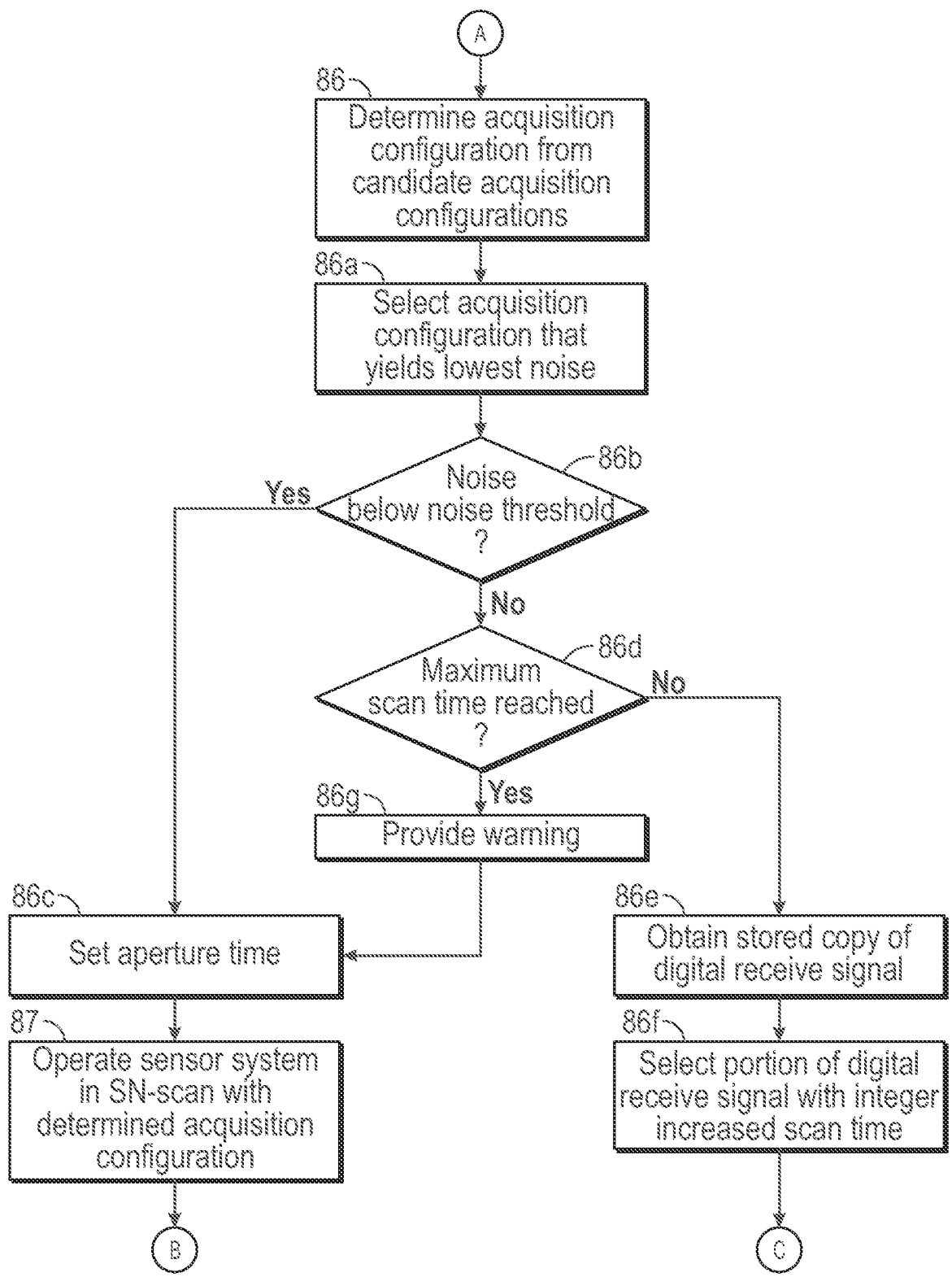

FIGS. 8A and 8B show a flow diagram of the operation of sensor circuit 1 in another exemplary embodiment. The operation corresponds to the preceding discussion, in particular referring to FIG. 6. Accordingly, the operation in steps 80-87 corresponds to the respective operation in steps 60-67, except for steps 82a and 86a-86g, as discussed in the following.

In step 82, the sensor receive signal, obtained from the capacitive touch sensing system 21 is A/D converted to obtain the digital receive signal, which corresponds to the processing, discussed in the preceding with reference to steps 32 and 62. In the present embodiment, the sensor receive signal obtained during step 81 has a maximum predefined scan time, i.e., a predefined maximum duration. For example, the predefined maximum duration may be 200 microseconds.

In step 82a, a copy of the digital receive signal with the maximum scan time is stored in memory 10. Then, a portion of the digital receive signal, namely with a predefined minimum scan time, is selected. The further processing of steps 83-85 is based on this portion of the digital receive signal.

In step 86, the acquisition configuration is selected from the candidate acquisition configurations. For clarity, the processing in step 86 is shown in FIG. 8B broken down in steps 86a-86g.

In step 86a, the configuration circuit 9 selects the candidate acquisition configuration that yields the lowest noise by evaluating the associated ENPEs, as determined in step 85. In step 86b, the configuration circuit 9 determines, if the selected ENPE meets or is lower than a predefined noise threshold, which may be defined as noise power or an SNR. For example, the predefined noise threshold with respect to SNR may be of 20 dB. If the selected ENPE meets or is lower than the predefined noise threshold, the selected candidate acquisition configuration is set to be the acquisition configuration for the SN-scan in step 87, corresponding to the preceding explanation. The aperture time for the SN-scan is set in step 86c as discussed with reference to FIG. 6.

In case the noise measure for the selected candidate acquisition configuration exceeds the predefined noise threshold, the processing continues with step 86d. Assuming that in step 86d, the maximum predefined scan time has not been reached, the configuration circuit 9 increases the scan time by approximately an integer multiple and evaluates this increased scan time. To do so, configuration circuit 9 in step 86e obtains the copy of the original digital receive signal with the maximum scan time from memory 10, which was stored in step 82a. Then, a larger portion of original digital receive signal is selected in step 86f, having a scan time that is an integer multiple of the previous scan time, e.g. double the scan time of the preceding portion that was evaluated. The processing then is continued in step 83 and the increased scan time is evaluated according to steps 83-86, as discussed before.

Mathematically, the Noise Robustness Level (NRL) is used herein as an index for a predefined maximum scan or measurement time. For example, let NRL $\rho=0$ denote the lowest NRL corresponding to the shortest maximum scan time $T_0$. For each candidate acquisition configuration, its packet length is set to the maximum number $\lfloor T_0 \cdot f_s \rfloor$ of samples that can be acquired during this time with sampling frequency $f_s=2 \cdot f_c$, where $f_c$ is the AC's carrier frequency. For example, when $T_0=125$ µs and $f_c=100$ kHz, then the resulting packet length is [125 µs·100 kHz]=12 ADC samples.

For the next higher NRL $\rho=1$, for each AC the packet length is determined according to Equation (1) depending on the low-pass filter design, for example with parameter k=2, i.e. approximately doubling the scan time.

The discussed steps are repeated in an iterative fashion until either an acquisition configuration is found that meets the noise threshold or the maximum predefined scan time is reached and no acquisition configuration meets the noise threshold. In the latter case, the query of step 86d leads to the generation of a warning signal at output 12 in step 86g, warning that no suitable acquisition configuration was found. The operation then proceeds to step 86c using the AC yielding the best noise measure for operation in the SN-scan.

As will be apparent from the preceding, a scan cycle may consist of a noise scan followed by an SN-scan using the AC which yielded the best noise measure. Then follows the next scan cycle with the next noise scan and SN-scan. The scan cycle then is repeated until the device is shut down.

As discussed in the preceding, the goal is to find the lowest NRL, i.e., the shortest required scan time and thus highest report rate, for which there is a candidate acquisition configuration yielding an ENPE of at most the noise threshold. When there are more than one acquisition configuration with the same scan time yielding an ENPE below the limit, the process of FIGS. 8A and 8B selects the AC yielding the lowest ENPE.

Figure 10:
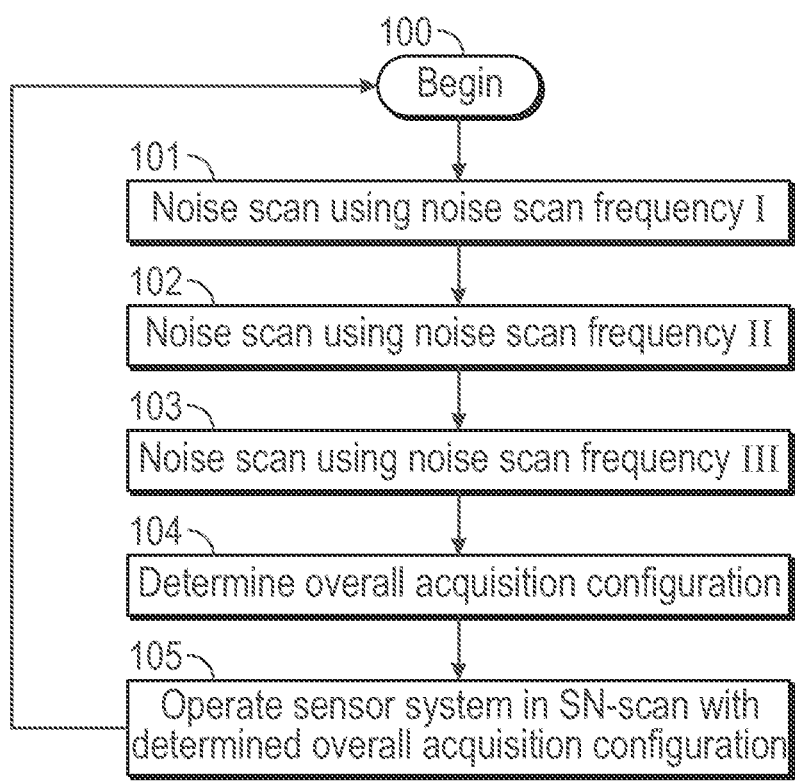
FIG. 10 illustrates the functionality of the sensor circuit of FIG. 1 in an exemplary flow diagram according to another embodiment.

When there are candidate ACs whose sampling frequencies do not share a common multiple, a slightly modified process may be employed that uses multiple predefined noise scan frequencies. A corresponding exemplary embodiment is shown in the flow diagram of FIG. 10.

Given a noise scan signal sampled at the predefined noise scan frequency $f_b$, it is possible to choose a multitude of different values for the integer decimation rate R.

However, the number of carrier frequencies $$f_c = \frac{f_b}{2R}$$

for which an ENPE can be computed given a signal sampled at noise scan frequency $f_b$ is practically limited.

To increase the set of candidate carrier frequencies, additional noise scan frequencies can be evaluated in an according embodiment. To distinguish these noise scan frequencies, we assign a superscript with index i=0, 1, 2, ... for the i-th candidate base frequency $f^{(i)}$. The j-th decimation rate for the i-th candidate base frequency is denoted as $R^{(i,j)}$, and its corresponding candidate carrier frequency and coefficient vector are denoted as $f^{(i,j)}$ and $w^{(i,j)}$, respectively.

We denote $L_\rho^{(i,j)}$ the packet length for the AC with base frequency index i, sub-frequency index j and NRL $\rho$.

The process begins in step 100 with the initialization of sensor circuit 1. For each predefined noise scan frequency, an individual noise scan is conducted in steps 101, 102, and 103. It is noted that the present embodiment is not limited to the conduction of three subsequent noise scans. The operation during each of the noise scans corresponds to one of the embodiments, discussed in the preceding with reference to FIGS. 1-9. In each step 101, 102, and 103, a noise measure for at least one candidate AC is obtained. In some embodiments, noise measures for the same candidate AC may be obtained in a multitude of steps 101, 102, and 103.

In step 104, an overall acquisition configuration is determined from the candidate acquisition configurations evaluated in the steps 101, 102, and 103. The overall acquisition configuration is determined by selecting the candidate acquisition configuration of steps 101, 102, and 103 for which the lowest ENPE is yielded overall. In other words, the overall acquisition configuration corresponds to the best possible candidate acquisition configuration of the noise scans 101, 102, 103. The idea of NRLs can also be applied for this case of multiple noise scan frequencies. In step 105, the sensor system is operated in an SN-scan using the overall acquisition configuration. The operation then reverts to step 100 until the processing of sensor circuit 1 is stopped.

As opposed to other known approaches, the approach as described according to the various embodiments not only provides a solution for identifying a relatively best carrier frequency, but a complete solution for noise robustness. It even yields robustness to, for example, AM noise and square noise. This is possible due to the highly accurate, quantitative SNR or noise power estimates which can be computed from the same measurement data but for different ACs. This further allows for finding a trade-off between touch report rate and output SNR.

Furthermore, for a selected low-pass filter design method, for example a boxcar window filter function, and with the requirement to assure improved noise robustness when increasing the scan time while leaving other AC parameters unchanged, many of the candidate ACs' parameters (such as, e.g., filter length and filter coefficient values) can be derived from few high-level requirements (such as, e.g., a 200 us scan time), allowing for a simple noise robustness configuration without the need for intense training.

A further exemplary aspect of this disclosure relates to obtaining decoupled copies of electric currents as well as digital processing for signal acquisition with overlapping aperture windows.

When capturing analog data to create a time-discrete or digital output sample, the time duration for which the analog signal is input to the measurement system, i.e., the time during which the measurement system is exposed to the outside world and thus its internal analog state is changed by the analog input signal, and can affect the output sample's value.

For an analog-to-digital converter (ADC) this time duration is known as the aperture time, as discussed in the preceding. To recall, FIG. 7 shows the magnitude of an ideal ADC's transfer function, also referred to as susceptibility to single-tone signals with frequency $f_n$, for aperture times 0.833 us and 2.5 us. We observe spectral zeros at multiples of the inverse aperture times, e.g. 1/0.833 us=1.2 MHz and 1/2.5 us=400 kHz, respectively.

Figure 11:
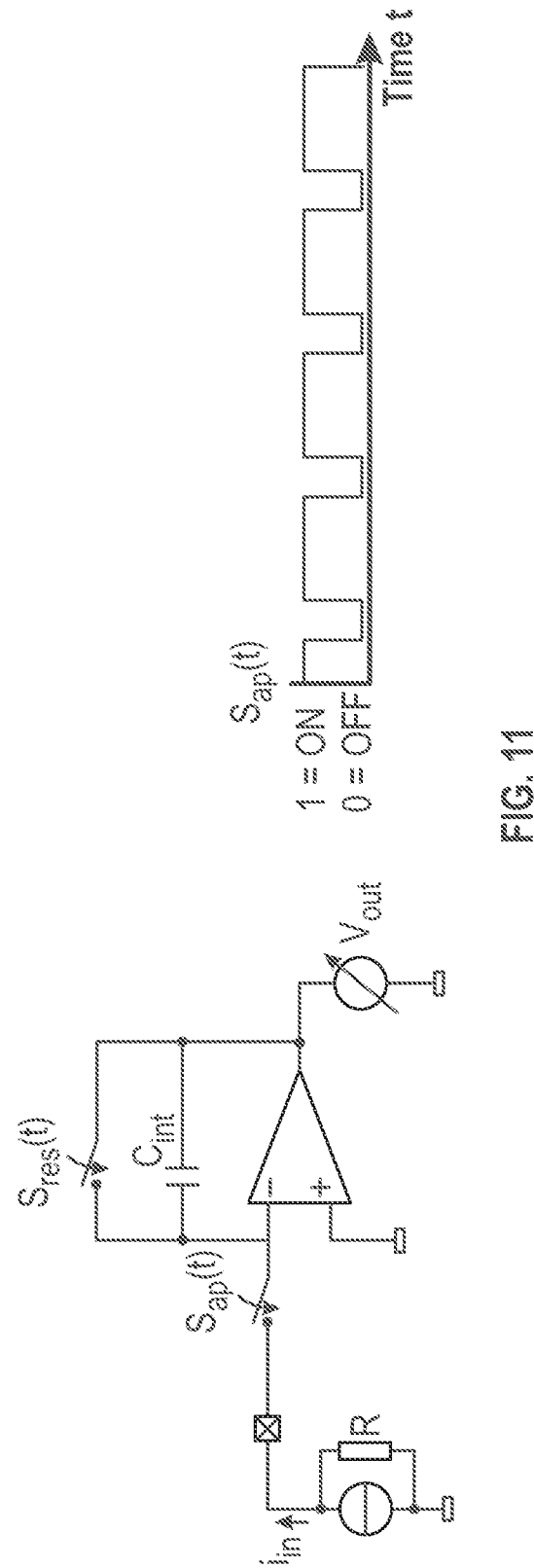
FIG. 11 shows a basic exemplary diagram for charge measurement using current integration and a corresponding timing diagram.

With some available touchscreen controllers, upon sensing an electrode, an electrical current flowing to, or from, a sensor electrode is integrated for a deterministic amount of time to measure the amount of electric charge moved during this time. This integration time is an aperture time. A basic exemplary diagram for charge measurement using current integration is shown in FIG. 11. It shows an unknown current source generating current $i_{in}$ which is integrated on capacitor $C_{int}$ while the aperture switch controlled with the signal $s_{ap}$ (t) illustrated in the right-hand side of the figure is on and the reset switch controlled with the signal $s_{res}$(t) is off. The resistor R of the current source is negligible when the aperture switch is on.

With standard serial processing of the analog signal, the aperture time typically cannot be longer than the time between two successive samples, the sample interval, because the aperture time windows of two successive samples cannot overlap. The higher the sampling frequency, the shorter the sample interval and thus the shorter the maximum aperture time.

There are applications where it may be beneficial to have adjacent or overlapping aperture time windows for successive samples. For example, in the preceding, two different types of measurements where the sampling frequency of the first type is a multiple of the sampling frequency of the second type is described, namely the 'noise scan' and the 'SN scan', yet the same aperture time is desired for both.

While the aperture time is chosen for the SN scan, the sampling frequency for the noise scan may be too high to fit an aperture window of the chosen time between two successive samples—the aperture windows would overlap.

Figure 12:
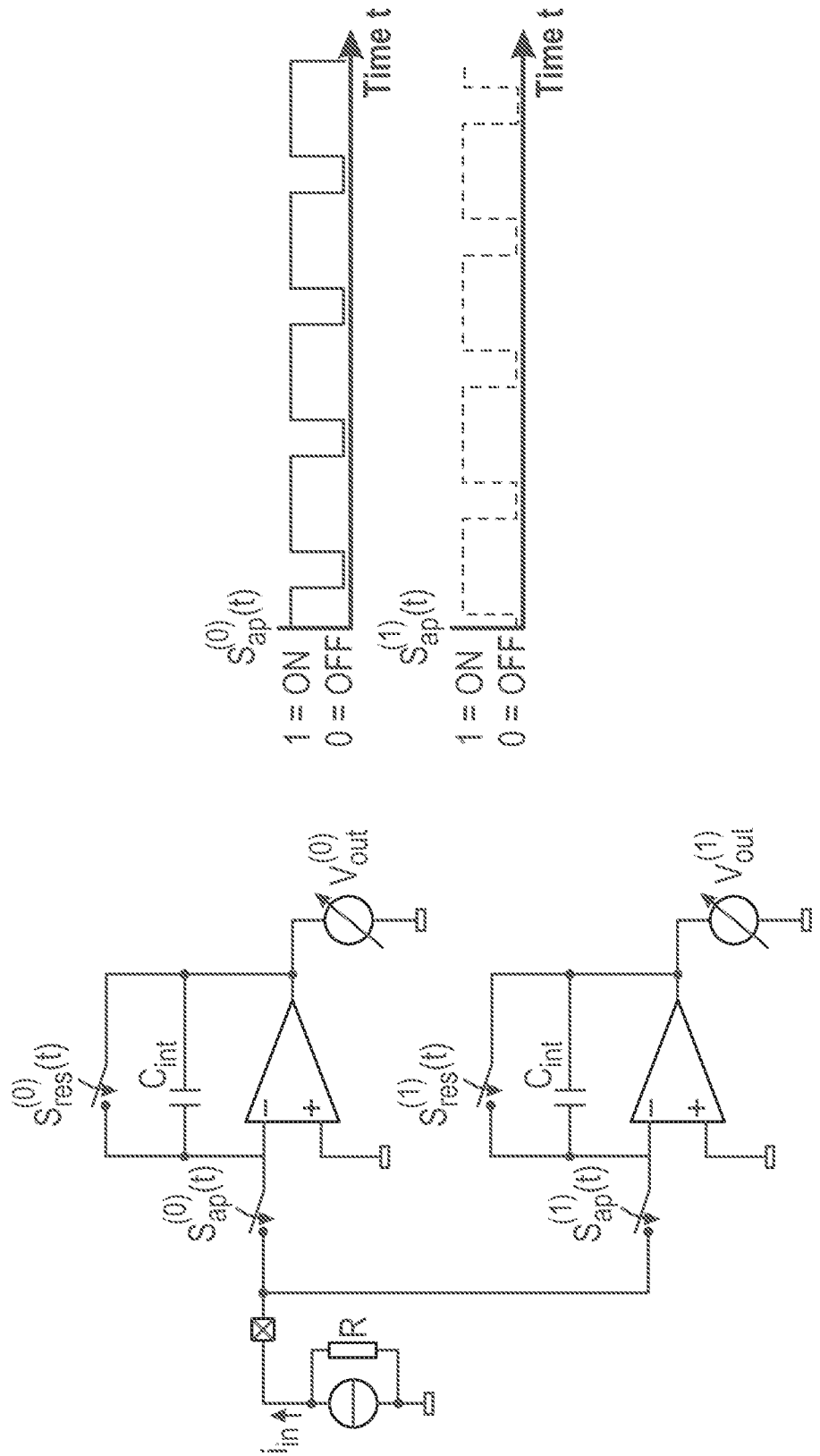
FIG. 12 shows another exemplary diagram for charge measurement using two current integrators together with a corresponding timing diagram.

To yield overlapping aperture time windows, some means of parallel processing may be beneficial. For example, for systems like the mentioned touchscreen controllers, two or more integrators would be beneficial. A problem may be the risk that these two or more integrators, when tapping the same pad or measurement node, may potentially mutually interfere their measurements. This is illustrated in FIG. 12, where on the right-hand side the states $s_{ap}^{(0)}(t)$ and $s_{ap}^{(1)}(t)$ of the aperture switches are plotted over time. During the time when both aperture switches $s_{ap}^{(0)}=s_{ap}^{(1)}=1$ are on, the unknown input current is split uncontrolled between the two integrators. Hence, deterministic measurement with overlapping aperture time windows may not be possible. The same analog input current cannot be measured multiple times this way without the measurements interfering each other.

In capacitive sensing, a desired aperture time may, e.g., depend on the sensor type at hand. For example, signal settling times are typically higher for ITO sensors than for PCB sensors due to the lower conductivity of ITO compared to copper. Therefore, a longer aperture time may be desired for an ITO sensor compared to a similarly shaped PCB sensor.

Based on the preceding, a solution may be to employ a current amplifier with one input and multiple outputs to yield a multitude of decoupled copies of the input current. Each copy may then be tapped with one integrator, and the integrator input currents are decoupled, i.e., mutually independent. In a digital post-processing step, the data obtained from the multitude of analog copies may, e.g., be rearranged to yield a single digital output signal.

The principle approach of the present discussion is to create multiple decoupled copies of an analog input signal. Then, analog processing and A/D conversion may be performed for each of the signal copies individually. The final step is to interleave, or multiplex, the digital samples from the different processing branches into a single output signal.

A standard electronic component where an input current is independent from an output current is a transistor. For more complex components like amplifiers which can contain such transistors, this independence holds too. When an input current controls two output currents, and the input current is independent of either output current, this implies that the output currents are mutually independent from each other too.

For some touchscreen controller devices and classical touchscreen controller measurements, the analog input signal is an electric current. Some existing touchscreen controller's analog front end (AFE) provides multiple, essentially identical parallel units for analog processing which are called slices. Each slice comprises an integrator.

Figure 13:
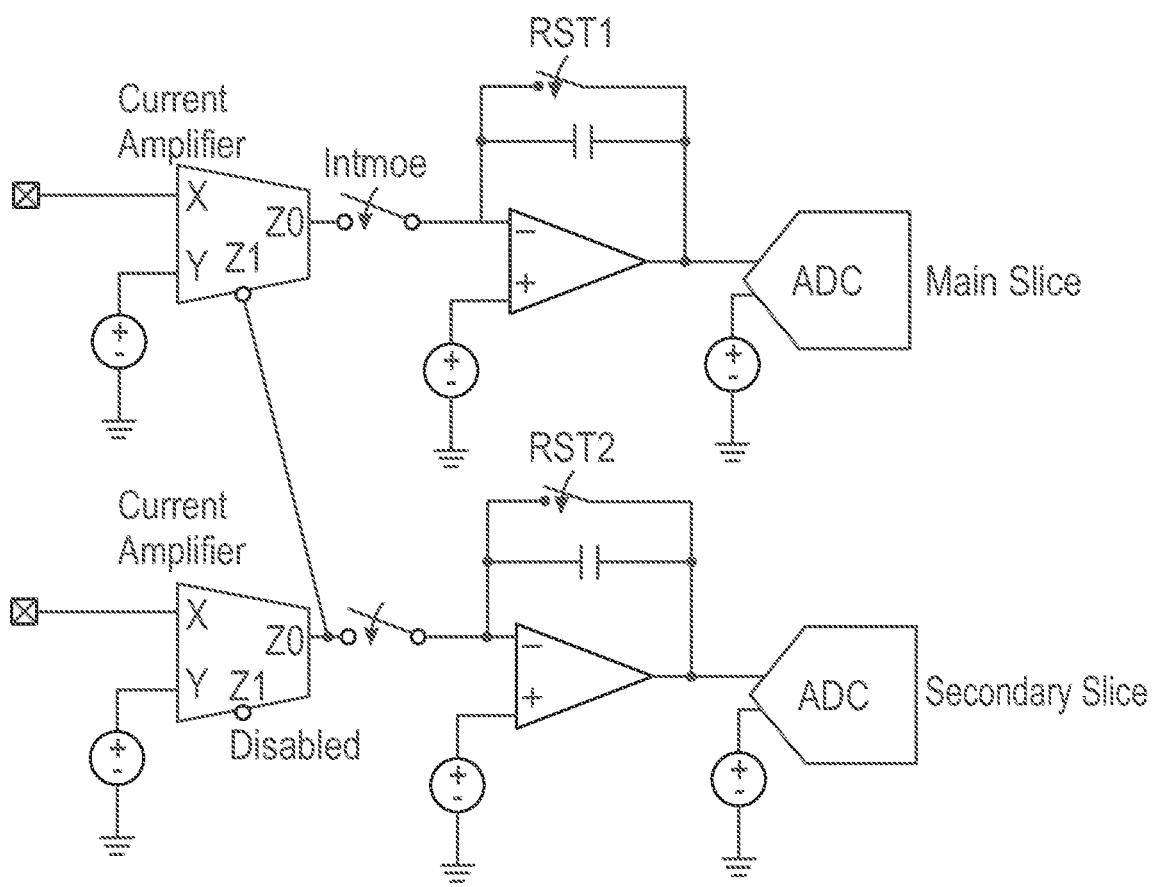
FIG. 13 schematically shows two slices of an exemplary analog front-end (AFE) of a touchscreen controller.

While it would be desirable to have fully independent timings for different integrators, some touchscreen controller devices may be restricted to a common sampling interval or sampling frequency for all slices. Apart from a required small digital modification, the existing devices, however, would allow independent measurements of two copies of an input current, where the aperture time windows of the two measurements do overlap. FIG. 13 schematically shows two of the so-called slices of an exemplary AFE of a touchscreen controller. The pad of the main slice in the top left of FIG. 13 is connected to the input X of a current amplifier. A non-inverting output Z0 of this current amplifier is connected to an integrator whose output is connected to an ADC. An inverting output Z1 of the main slice's current amplifier is connected to the input of an integrator on a secondary slice, again followed by an ADC. The second slice's current amplifier is disconnected such that only the main slice's amplifier inverted current is input to the integrator. While the aperture switches INTMOE can be controlled independently for main and secondary slice, the integrator reset switches RST1 and RST 2 may not be controllable independently.

In the preceding, a need for overlapping aperture time windows, or current integration windows, has been discussed for the noise scan. For such a noise scan, one may be primarily interested in the measurement data from a single slice, for example a slice connected to a sensor electrode where a highest noise level may be expected. Assuming that a main slice has been connected to this noisiest electrode, for example this noisiest electrode is connected to the pad of the Main Slice in FIG. 13, then theoretically, two decoupled copies of the main slice's input current are obtained, and on both the main and secondary slice, it is possible to open or close the aperture or reset switches without affecting the current on the respective other slice.

Figure 14:
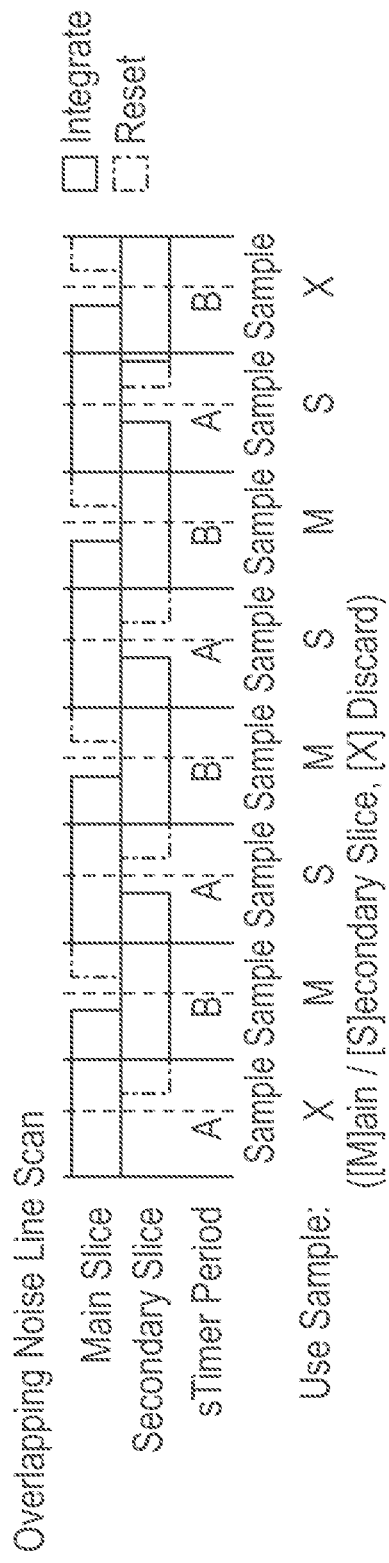
FIG. 14 shows an exemplary timing diagram for current integration and integrator resetting with slice-independent control of aperture and reset switches.

FIG. 14 shows an exemplary timing diagram for current integration and integrator resetting when assuming slice-independent control of aperture and reset switches. Each integration window is preceded by a reset of the integration capacitor. The integration windows of the main and secondary slice are interleaved and overlapping in time. After analog-to-digital (A/D) conversion, the samples from the two slices are interleaved to yield a single digital signal. For example, the new single digital signal is created by concatenating the first output sample from the main slice, the first output sample from the secondary slice, the second sample from the main slice, the second sample from the secondary slice, and so on. Note that in the context of a noise scan, the obtained signal is decimated before further processing, and after decimation the current integration windows corresponding to successive samples in these decimated signals are no longer overlapping.

However, while integration can be controlled for main and secondary slices separately, the timing of FIG. 14 may be not realizable with some touchscreen controller devices because of an integrator reset control which is common for main and secondary slices.

Figure 15:
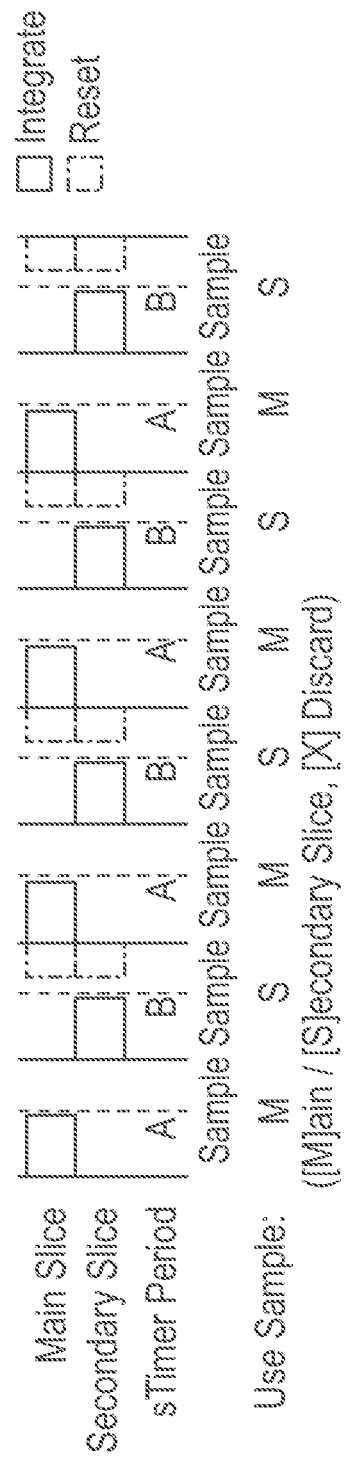
FIG. 15 shows an exemplary timing diagram for current integration and integrator resetting without slice-independent control of aperture and reset switches.

What can be done with some touchscreen controllers is a timing similar to that in FIG. 14, but with non-overlapping integration windows, as is illustrated in FIG. 15. In fact, A/D conversion also is conducted synchronously on the main and secondary slices, as indicated by vertical dashed lines, such that every other digital sample from each slice is undesired—because it is acquired not at the end of the current integrators' integration phase but during a possibly random integrator state—and thus may be discarded.

Figure 16:
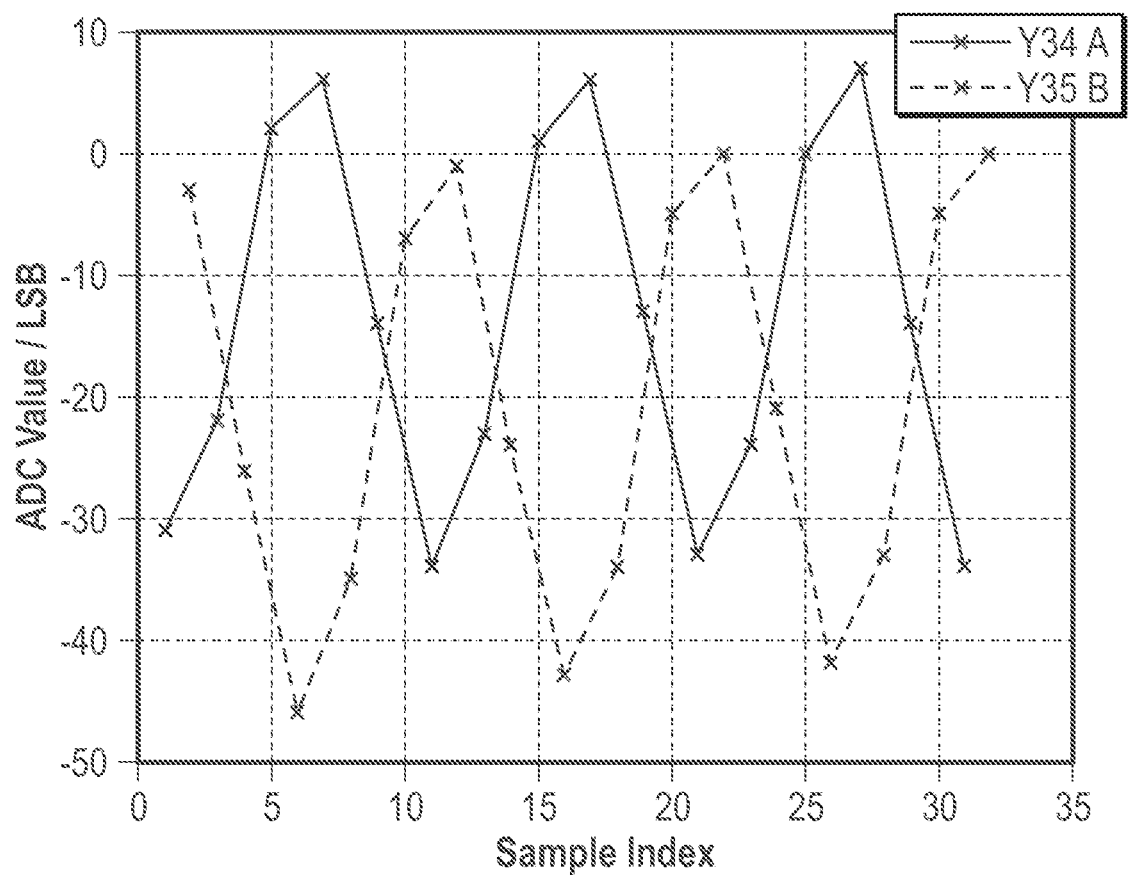
FIG. 16 shows data obtained using the timing configuration of FIG. 15.

Data obtained with a test implementation using the timing configuration of FIG. 15 is shown in FIG. 16. A single-tone signal with 20 kHz is coupled into a sensor electrode connected to a slice Y34, and the sampling frequency is 200 kHz. The samples from the main slice Y34 and a secondary slice Y35 are shown in an interleaved manner, while the solid and dashed lines connect the samples from each slice, respectively. It can be observed that the signal of slice Y35 (dashed line) still needs to be re-inverted and shifted, as the signal for Y35 is approximately a mirror image of the signal for Y34 mirrored at the level of ADC value −15. The required offset would need to be determined (for example, with the pad/electrode disconnected, i.e., no input signal)

before the actual signal acquisition, however, signal reconstruction in the digital domain is feasible.

When referring to a 'copy' of an analog signal herein, an exact one-to-one copy is not necessarily required. For some applications, a strictly monotonic copying function may be sufficient, and any distortion may be compensated for in the digital domain.

For systems with processing as in touchscreen controller devices where a current is being integrated before A/D conversion, however, only a linear distortion of the input signal, i.e., the input current, may be acceptable in some embodiments to allow digital equalization (i.e., compensation of the distortion). Also, in general, a more or less linear copying function can be beneficial, for example, when considering signal equalization together with ADC quantization noise.

The preceding touchscreen controller specific solution allows for overlapping aperture time windows when the acquisition frequency on main and secondary slices are the same but only the acquisition phase differs. However, when hardware control would allow fully independent timing for different slices, given multiple copies of the same analog signal, it would be possible to yield a generic solution to the problem of signal acquisition for noise level evaluation with different AFE configurations, including arbitrary different sampling frequencies and aperture time windows.

Some embodiments of a sensor system with an analog input signal $x(t)$ provides that the sensor system makes two or more analog copies $y_i(t)$, i=0, 1, . . . of $x(t)$.

In some embodiments, the copy $y_i(t)$ is a strictly monotonic function of $x(t)$.

In some embodiments, the copy $y_i(t)$ is a linear functions $y_i(t)=b_i*x(t)+a_i$ of $x(t)$.

In some embodiments, the sensor system is a capacitive sensing system.

In some embodiments, the signal $x(t)$ is an electric current.

In some embodiments, the signal $y(t)$ is an electric current.

In some embodiments, two or more analog signal copies $y_i(t)$ are input to an analog circuit $H_i$ for generating digital samples and the aperture windows of at least two circuits $H_i$ overlap in time.

In some embodiments, the analog circuits $H_i$ comprise an integrator.

In some embodiments, the sampling frequency on two or more circuits $H_i$ is the same.

In some embodiments, the sensor system comprises a current amplifier whose input is fed with $x(t)$ and where the current amplifier has two or more output stages sharing one input stage.

In some embodiments, samples from signals on different branches are multiplexed yielding a single output signal.

The generic solution for making copies of an analog input signal to yield decoupled signals for independent processing enabled herein solves the problem of comparing any AFE configurations with each other and is beneficial for finding a suitable acquisition configuration.

In some embodiments, the aperture time is increased beyond the sampling period, thus allowing a highly accurate noise power estimation.

As compared to an alternative approach of evaluating signals from different sensor electrodes, for the discussed approach there is no risk that noise is coupled into the different sensor electrodes with different coupling intensities, which could give wrong bias to the estimates-simply because of the discussed approach where all data evaluated originates from a single sensor electrode.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, without limitation. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, and so on. Optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Terms such as "component", "module", "circuitry", "circuit", "device", "unit", and "system" are intended to encompass hardware, software, firmware, or any combination thereof. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. The term "exemplary" used throughout the specification means "serving as an example, instance, or exemplification" and does not mean "preferred" or "having advantages" over other embodiments.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/FIGS. should be considered only as exemplary, and not limiting, unless otherwise specifically noted.

Thus, the scope of the invention is intended to be defined only in terms of the following claims as may be amended, with each claim being expressly incorporated into this description as an embodiment of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of determining a noise-robust acquisition configuration for operation of a sensor system, comprising performing a noise scan, the noise scan comprising:
   obtaining a sensor receive signal from the sensor system without a stimulus signal being applied to the sensor system;
   determining a digital sensor receive signal from the sensor receive signal by A/D conversion of the sensor receive signal at a predefined noise scan frequency;
   determining a plurality of decimated digital sensor receive signals by integer decimation of the digital sensor receive signal using two or more decimation rates that differ from each other, wherein respective ones of the two or more decimation rates are associated with a respective candidate acquisition configuration for the sensor system;
   in response to determining the plurality of decimated digital sensor receive signals, determining one or more noise measures for multiple candidate acquisition configurations by evaluating one or more of the plurality of decimated digital sensor receive signals; and
   using the one or more noise measures, determining the acquisition configuration for operation of the sensor system from the multiple candidate acquisition configurations; wherein
   determining the acquisition configuration comprises selecting a preferred noise measure from the one or more noise measures and selecting a first candidate acquisition configuration of the candidate acquisition configurations, which first candidate acquisition configuration is associated with the preferred noise measure as the acquisition configuration.

2. The method of claim 1, wherein the preferred noise measure yields the lowest noise level of the one or more noise measures.

3. The method of claim 1, wherein for respective ones of the two or more decimation rates, corresponding groups of decimated digital sensor receive signals are determined, wherein in each group, the decimated digital sensor receive signals differ from each other in a different starting phase.

4. The method of claim 3, wherein one or more of the noise measures are determined by an effective noise power estimation, which comprises a determination of a sum of phase-instantaneous noise measures over the respective decimated digital sensor receive signals of one of the groups of decimated digital sensor receive signals.

5. The method of claim 4, wherein the phase-instantaneous noise measure is a sum of samples of a decimated digital sensor receive signal weighted with coefficients from a coefficient vector.

6. The method of claim 1, wherein the acquisition configuration comprises at least one or more of a sampling frequency for A/D conversion, an operating frequency of a stimulus signal for operation of the sensor system, a scan duration, a number of samples to be acquired, and low-pass filter coefficients.

7. The method of claim 1, wherein the predetermined noise scan frequency is significantly higher than an operating frequency of a stimulus signal during operation of the sensor system.

8. The method of claim 1, wherein the two or more decimation rates are multiples of 2.

9. The method of claim 1, wherein the sensor receive signal during the noise scan is acquired without a stimulus signal being applied to the sensor system.

10. The method of claim 1, wherein determining the acquisition configuration for operation of the sensor system from the candidate acquisition configurations comprises comparing the one or more noise measures with a noise threshold and in case the noise threshold is not met by any of the noise measures:
    increasing a scan time of at least one of the candidate acquisition configurations to obtain at least one updated candidate acquisition configuration;
    determining one or more updated noise measures for the at least one updated candidate acquisition configuration; and
    comparing the one or more updated noise measures with the noise threshold.

11. The method of claim 10, wherein the increased scan time is an integer multiple of a scan time of a preceding noise scan.

12. The method of claim 1, comprising following the noise scan, operating the sensor system during a signal-and-noise scan using the acquisition configuration determined during the noise scan.

13. The method of claim 12, comprising subsequently conducting multiple noise scans between two signal-and-noise scans, wherein the multiple noise scans use predefined noise scan frequencies, wherein the predefined noise scan frequencies of at least some of the multiple noise scans differ from each other.

14. The method of claim 13, comprising determining an overall acquisition configuration for operation of the sensor system during a signal-and-noise scan from acquisition configurations obtained during the subsequently conducted multiple noise scans.

15. The method of claim 12, wherein an aperture time of an A/D conversion during the noise scan is identical to, or substantially an integer fraction of, an aperture time set for the signal-and-noise scan.

16. The method of claim 1, wherein the sensor system is one or more of a capacitive sensor system and a touchscreen sensor system.

17. A non-transitory computer-readable medium including contents that are configured to cause a sensor circuit to conduct the method of claim 1.

18. A sensor circuit to determine an acquisition configuration for operation of a sensor system, comprising:
- a sensor interface for obtaining a sensor receive signal from the sensor system without a stimulus signal being applied to the sensor system;
- an A/D converter to determine a digital sensor receive signal from the sensor receive signal by A/D conversion of the sensor receive signal at a predefined noise scan frequency;
- a decimation circuit, to determine a plurality of decimated digital sensor receive signals by integer decimation of the digital sensor receive signal using two or more decimation rates that differ from each other, wherein respective ones of the two or more decimation rates are associated with a respective one of multiple candidate acquisition configurations for the sensor system;
- a noise evaluation circuit, to, in response to determining the plurality of decimated digital sensor receive signals, determine one or more noise measures for multiple candidate acquisition configurations by evaluating one or more of the plurality of decimated digital receive signals; and
- a configuration circuit, to determine the acquisition configuration for operation of the sensor system from the multiple candidate acquisition configurations using the one or more noise measures; wherein
- determining the acquisition configuration comprises selecting a preferred noise measure from the one or more noise measures and selecting a first candidate acquisition configuration of the candidate acquisition configurations, which first candidate acquisition configuration is associated with the preferred noise measure as the acquisition configuration.

19. A capacitive touch sensing system, comprising:
- one or more electrodes, configured for capacitive sensing; and
- the sensor circuit of claim 18, which sensor circuit is connected to at least one of the one or more electrodes.

20. A method of determining a noise-robust acquisition configuration for operation of a communication system, comprising performing a noise scan, the noise scan comprising:
- obtaining a receive signal from the communication system without a stimulus signal being applied to the communication system;
- determining a digital receive signal from the receive signal by A/D conversion of the receive signal at a predefined noise scan frequency;
- determining a plurality of decimated digital receive signals by integer decimation of the digital receive signal using two or more decimation rates that differ from each other, wherein respective ones of the two or more decimation rates are associated with a respective one of multiple candidate acquisition configurations for the communication system;
- in response to determining the plurality of decimated digital receive signals, determining one or more noise measures for multiple candidate acquisition configurations by evaluating one or more of the plurality of decimated digital receive signals; and
- using the one or more noise measures, determining the acquisition configuration for operation of the communication system from the multiple candidate acquisition configurations; wherein
- determining the acquisition configuration comprises selecting a preferred noise measure from the one or more noise measures and selecting a first candidate acquisition configuration of the candidate acquisition configurations, which first candidate acquisition configuration is associated with the preferred noise measure as the acquisition configuration.

21. A communication circuit to determine an acquisition configuration for operation of a communication system, comprising:
- a communication system interface to obtain a receive signal from the communication system without a stimulus signal being applied to the communication system;
- an A/D converter to determine a digital receive signal from the receive signal by A/D conversion of the receive signal at a predefined noise scan frequency;
- a decimation circuit, to determine a plurality of decimated digital receive signals by integer decimation of the digital receive signal using two or more decimation rates that differ from each other, wherein respective ones of the two or more decimation rates are associated with a respective one of multiple candidate acquisition configuration for the communication system;
- a noise evaluation circuit, to, in response to determining the plurality of decimated digital receive signals, determine one or more noise measures for multiple candidate acquisitions configuration by evaluating one or more of the plurality of decimated digital receive signals; and
- a configuration circuit, to determine the acquisition configuration for operation of the communication system from the multiple candidate acquisition configurations using the one or more noise measures; wherein
- determining the acquisition configuration comprises selecting a preferred noise measure from the one or more noise measures and selecting a first candidate acquisition configuration of the candidate acquisition configurations, which first candidate acquisition configuration is associated with the preferred noise measure as the acquisition configuration.

22. A method of determining a noise-robust acquisition configuration for operation of a sensor system, comprising performing a noise scan, the noise scan comprising:
- obtaining a sensor receive signal from the sensor system without a stimulus signal being applied to the sensor system;
- determining a digital sensor receive signal from the sensor receive signal by A/D conversion of the sensor receive signal at a predefined noise scan frequency;
- determining a plurality of decimated digital sensor receive signals by integer decimation of the digital sensor receive signal using two or more decimation rates that differ from each other, wherein respective ones of the two or more decimation rates are associated with a respective candidate acquisition configuration for the sensor system;
- in response to determining the plurality of decimated digital sensor receive signals, determining one or more noise measures for multiple candidate acquisition configurations by evaluating one or more of the plurality of decimated digital sensor receive signals; and
- using the one or more noise measures, determining the acquisition configuration for operation of the sensor system from the multiple candidate acquisition configurations; wherein
- determining the acquisition configuration for operation of the sensor system from the candidate acquisition configurations comprises comparing the one or more noise measures with a noise threshold and in case the noise threshold is not met by any of the noise measures:

increasing a scan time of at least one of the candidate acquisition configurations to obtain at least one updated candidate acquisition configuration;

determining one or more updated noise measures for the at least one updated candidate acquisition configuration; and comparing the one or more updated noise measures with the noise threshold.

23. A non-transitory computer-readable medium including contents that are configured to cause a sensor circuit to conduct the method of claim 22.

24. A sensor circuit to determine an acquisition configuration for operation of a sensor system, comprising:

a sensor interface for obtaining a sensor receive signal from the sensor system without a stimulus signal being applied to the sensor system;

an A/D converter to determine a digital sensor receive signal from the sensor receive signal by A/D conversion of the sensor receive signal at a predefined noise scan frequency;

a decimation circuit, to determine a plurality of decimated digital sensor receive signals by integer decimation of the digital sensor receive signal using two or more decimation rates that differ from each other, wherein respective ones of the two or more decimation rates are associated with a respective one of multiple candidate acquisition configurations for the sensor system;

a noise evaluation circuit, to, in response to determining the plurality of decimated digital sensor receive signals, determine one or more noise measures for multiple candidate acquisition configurations by evaluating one or more of the plurality of decimated digital receive signals; and a configuration circuit, to determine the acquisition configuration for operation of the sensor system from the multiple candidate acquisition configurations using the one or more noise measures; wherein determining the acquisition configuration for operation of the sensor system from the candidate acquisition configurations comprises comparing the one or more noise measures with a noise threshold and in case the noise threshold is not met by any of the noise measures:

increasing a scan time of at least one of the candidate acquisition configurations to obtain at least one updated candidate acquisition configuration;

determining one or more updated noise measures for the at least one updated candidate acquisition configuration; and comparing the one or more updated noise measures with the noise threshold.

25. A capacitive touch sensing system, comprising:

one or more electrodes, configured for capacitive sensing; and the sensor circuit of claim 24, which sensor circuit is connected to at least one of the one or more electrodes.

* * * * *